(12) United States Patent
Carlson et al.

(10) Patent No.: US 9,152,934 B2
(45) Date of Patent: Oct. 6, 2015

(54) ARRANGEMENTS FOR ADMINISTRATING AND MANAGING A CONSTRUCTION PROJECT

(75) Inventors: Alan L Carlson, Lago Vista, TX (US); Dennis Duke, Burlington, IA (US); Marc Eric Zaiser, Mediapolis, IA (US); Michael Norton Bredar, Burlington, IA (US); James William Miller, Burlington, IA (US)

(73) Assignee: ebidletting.com, Burlington, IA (US)

( * ) Notice: Subject to any disclaimer, the term of this patent is extended or adjusted under 35 U.S.C. 154(b) by 673 days.

(21) Appl. No.: 13/302,661

(22) Filed: Nov. 22, 2011

(65) Prior Publication Data
US 2013/0132440 A1    May 23, 2013

(51) Int. Cl.
*G06F 17/30* (2006.01)
*G06Q 10/06* (2012.01)
*G06Q 50/08* (2012.01)

(52) U.S. Cl.
CPC ............... *G06Q 10/06* (2013.01); *G06Q 50/08* (2013.01)

(58) Field of Classification Search
CPC ....... G06Q 10/06; G06Q 50/08; G06Q 30/08; G06Q 40/04
USPC .................................. 707/792, 769; 705/7.38
See application file for complete search history.

(56) References Cited

U.S. PATENT DOCUMENTS

| | | | |
|---|---|---|---|
| 2003/0101127 A1* | 5/2003 | Cornelius | 705/37 |
| 2003/0154406 A1* | 8/2003 | Honarvar et al. | 713/201 |
| 2008/0147478 A1* | 6/2008 | Mall et al. | 705/10 |
| 2011/0282714 A1* | 11/2011 | Cullen et al. | 705/7.38 |

* cited by examiner

*Primary Examiner* — Sheree Brown
(74) *Attorney, Agent, or Firm* — Kermit D. Lopez; Luis M. Ortiz; Ortiz & Lopez, PLLC

(57) ABSTRACT

In some embodiments, a construction project administration system and method are disclosed that queries an administrator as to ownership, construction specifications, bidding parameters etc. for a proposed construction project using active first, second and third level questions and accepts and stores replies to the active questions. The stored replies can be compared to predetermined answers, and questions that become irrelevant based on the answers can be deactivated and taken off a list of questions to be asked. After a sufficient amount of questions are answered, the system can auto-configure a process for online construction management. For example a website can be set up that can be used by all parties to the project to automate communications, the exchange of data, status updates etc. including the submission of bids, acceptance of bids, and the award of contracts and many more paperless construction management features.

20 Claims, 8 Drawing Sheets

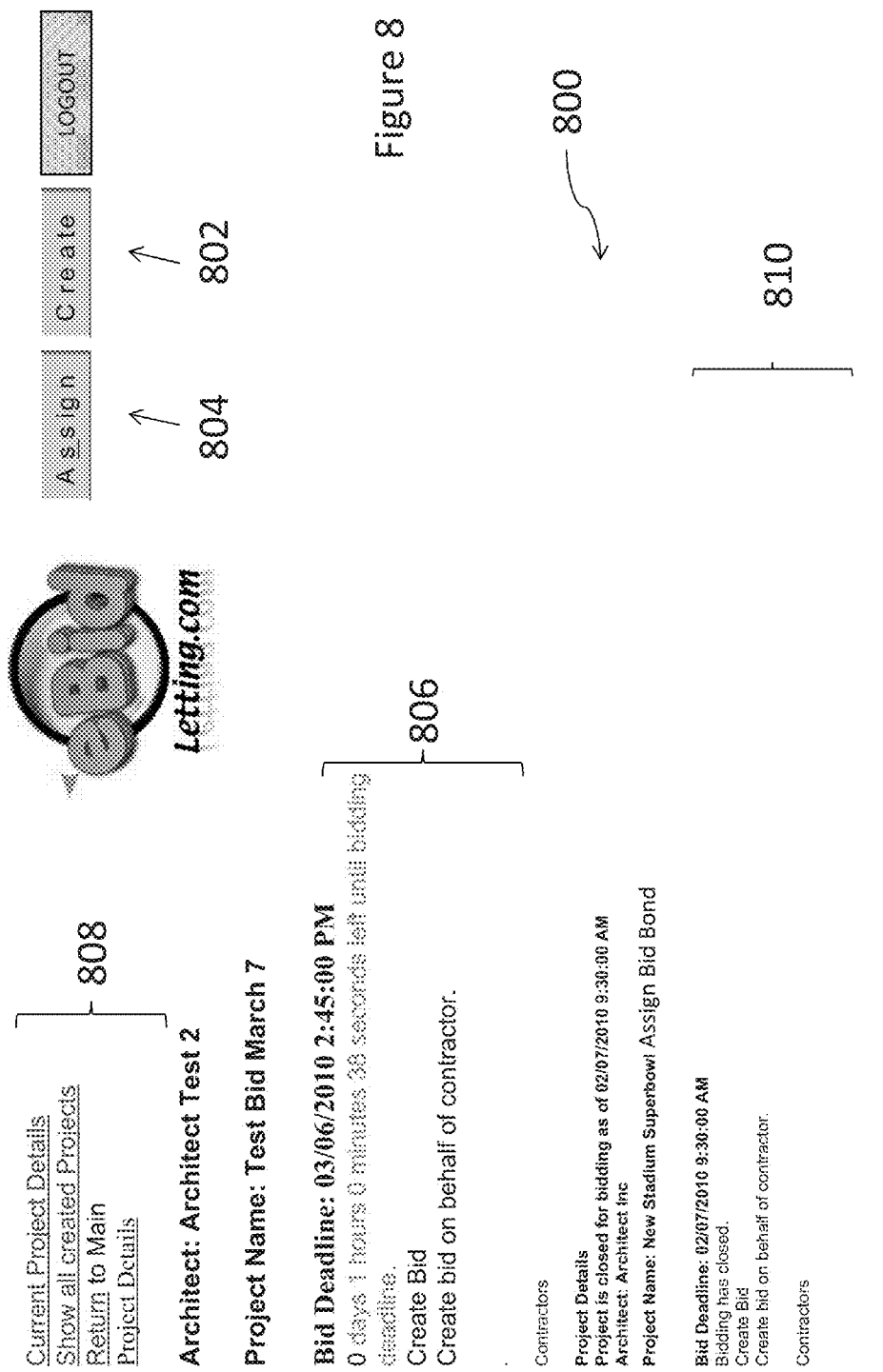

ARRANGEMENTS FOR ADMINISTRATING AND MANAGING A CONSTRUCTION PROJECT

FIELD OF INVENTION

The present disclosure is related to the field of online administration of construction projects or improvements to land and more particularly, to the field of online applications that provide a framework for administrating and managing construction projects.

BACKGROUND

Construction projects account for a relatively large percentage of the United States economy. Construction projects can be dissected into discrete phases, such as a planning phase, a tendering phase (i.e. request for bids phase), a letting and/or job awarding phase, a bid wind down phase, a financing phase, a procurement phase, construction management phase, a deliverable approval phase, an awarding of occupancy phase, and a punch out phase and a closing phase. Administration of each phase is no small task and typically required an army of skilled personal.

More specifically, the planning phase can include engaging a relator, and finding a suitable piece of land, locating an acceptable architect, finding an engineering firm 110 to create the drawing package and finding a liaison to obtain plan approval from the appropriate governmental entities. It can be appreciated that, for even a medium sized construction project there are many entities to be coordinated and many decisions to be made in each stage and sloppy administration and miscommunications can be very costly for management of a construction project from "cradle to grave.

It can be appreciated that, just the task of efficiently tender a request for bids on many construction projects requires many issues to be addressed where a failure in this phase can be extremely costly the owner. Thus, inefficient construction management is often very costly because there are many important issues in each phase, which if not properly addressed or if not addressed in a timely manner, can double or triple the cost of each stage. For example, in the biding stage if issues such as what qualifications will be required of general contractors, auditors, architects, engineer and sub-contractors are not well defined, if how the tendered documents will be accessed by a prospective bidders, what a prospective bidder will be required to provide, what the bonding requirements will be, how addendums will be administrated, when, where and how the bid will be let, how the permitting will be administrated, how the contractors will be paid, how the project will be financed and hundreds of other large and small issues are not appropriately addresses the cost of the finished project can become grossly over budget.

In view of the complexity of administrating a construction project, most would agree that a flexible tool that would allow for the efficient administration and management of the bidding process alone could and would save an owner a significant amount of money. It can also be appreciated that there is no "one size fits all" process that will provide efficient and effective management and administration for each and all phase of a construction process because each owner, each project and each phase will have specific needs, circumstances and requirements.

For example, if the owner of a construction project is a private entity, as opposed to a government or quasi-government agency, many additional considerations need to be managed and administered, for example meeting minority quotas, the openness of the project data, building code requirements to be met etc. Non-compliance with the legal requirements for a construction project and monitoring thereof, can prove expensive and even disastrous if not documented and attended to. It can further be appreciated how different a process for administrating a private construction project is than the process for administrating a construction project for a state run agency. Regardless of the entity (i.e. private or government) administrating and managing building and improvements to, infrastructure complex, inefficient and expensive and if administration and management lacks and proper procedures or if the proper procedures are not followed, serious costs and liability can result.

As eluded to above, in a common scenario when an entity, such as owner wants to build improvements, or desires construction services the owner will hire a realtor to find land and an architect to develop a concept that meets the entity's needs. In turn, the architect may hire an engineering firm to do the engineering and then the architect will distribute or publish a request for bids or provide a package of tender documents (Specifications, Drawings and Addenda) to prospective bidders, often general contractors. However, to comply with the law, to be fair to bidders and in order to select "the best" bidder, and save money in all phases, many processes and regulations have to be defined and followed by all involved parties. In many scenarios, the government has strict guidelines for various aspects of the overall project and it is very important that all of these guidelines are complied with. If the bidding, awarding and building process is not properly monitored and administrated and not in compliance, expensive lawsuits between one or more parties often results.

Currently, state of the art competitive bid processes utilized in the construction industry require general contractors, sub-contractors and suppliers alike to generate and hand deliver hard copies or paper documents to the architect, prior to the time of bid letting. The general contractor typically receives and assembles quotations/offers/bids from numerous subcontractors, bonding agencies, and suppliers, and then reviews these documents, compiles a bid, reviews the bid for completeness and accuracy and then appoints an employee to drive to a specified bid letting location often hundreds of mile away from the general contractors office to timely submit a completed bid for a project. This process costs every general contractor who bids thousands, if not tens of thousands of dollars for each project bid. Then, if a general contractor's has an error, is incomplete or is not timely filed, the bid will not be accepted or approved by the bid administrator eliminating any chance that the general contractor might recouping the time and expense invested in the bid. Thus, a bid package with a simple error or defect can result in a general contractor loosing ten thousand dollars with no hope of recovery of such an expense.

As part of this process a general contractor must painstakingly acquire all bids from all required subcontractors, material suppliers etc., a sufficient time in advance of the bid deadline such that the general contractor can review and compile all of these sub-bids and put all of the pieces of the finished bid together, print the entire bid out on paper, then get the bid timely delivered in person to the architect who after determining if the bid meets the minimum requirements will open the bid.

Thus, in a typical bid letting process, the general contractor will hand deliver a paper bid at a location indicated in the instructions to bidders prior to a specified day and time. After the deadline for bid submission has passed, the administrator will not accept any bids. When an architect is the bid administrator an architect will typically open the bids one by one, insuring that the bid meets the critical requirements. For public construction projects, after opening a bid, the architect will proceed to read aloud each bid received and opened. Typically, the bid courier or delivery person stays for the letting and records what the bit letting data on a bid tabulation sheet. The representative would then drive many miles back to the office to disclose the results to the principals of the construction company.

It can be appreciated that the current manual bidding system requires a general contractor to send a competent person, often for a full work day, to deliver the bid often driving several hundred miles to deliver the bid and return with results. Accordingly, the bid delivery process alone often costs a general contractor from five hundred to over a thousand dollars on bid day due to wages, travel expenses and loss of production. It would be beneficial to have a paperless construction project administration and management system that could set up, monitor, manage and administrate a construction process saving time, money, resources, and the environment.

BRIEF DESCRIPTION OF THE DRAWINGS

Aspects of the disclosed embodiments will become apparent upon reading the following Detailed Description and upon reference to the accompanying drawings in which, like references may indicate similar elements:

FIG. 8 is a graphical user interface that can be utilized by a bid administrator to administrate the disclosed process.

SUMMARY OF THE INVENTION

Figure 1:
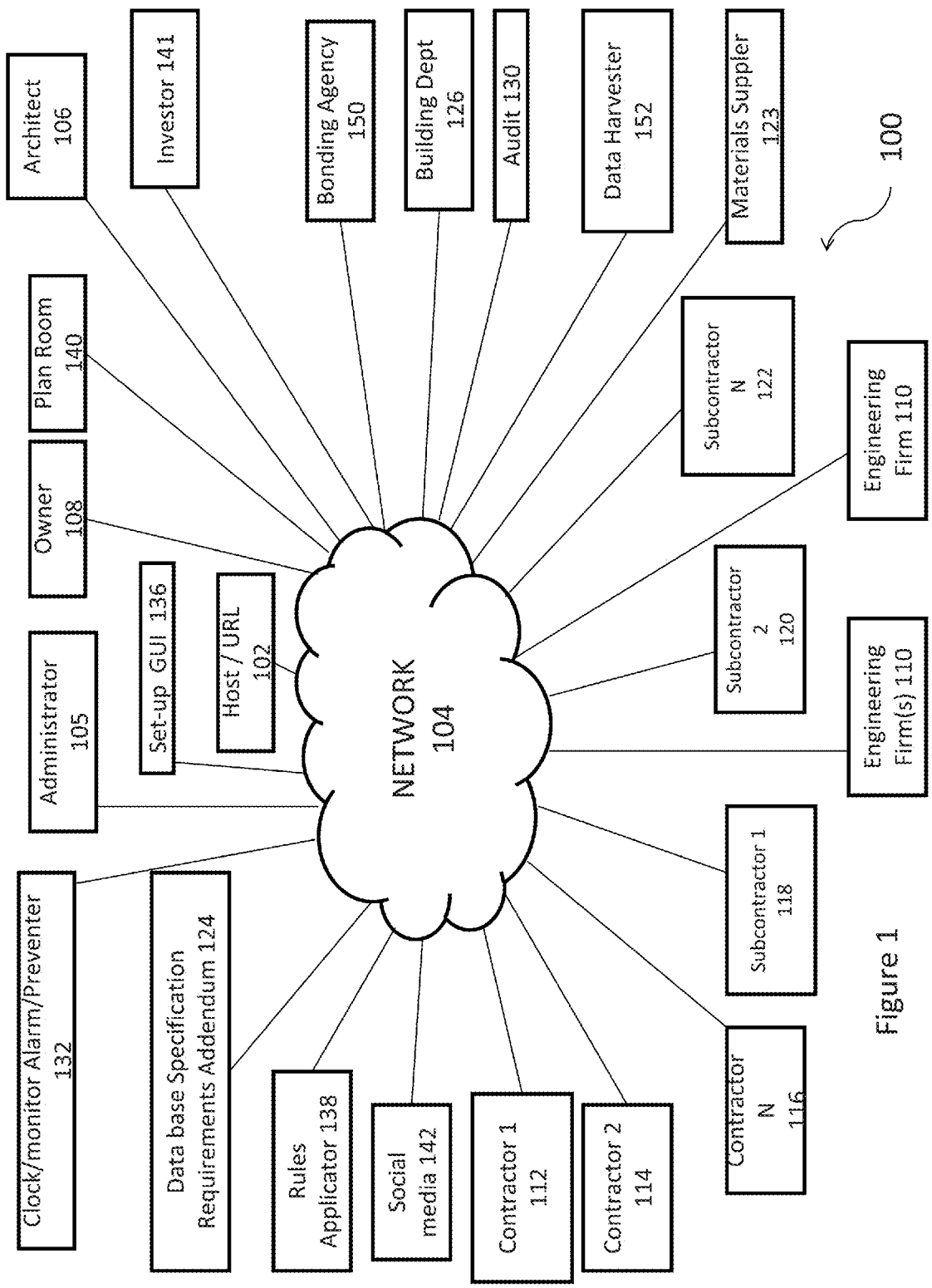
FIG. 1 is a block diagram of a system that can be utilized to facilitate the administration and management of a construction project.

In some embodiments, a computer program product is disclosed that includes a computer readable storage medium including instructions that, when executed by a processor cause the processor to store in a relational database, queries associate with a first second or third tier and predetermined answers to questions in the tiers, wherein first tier questions relate to ownership of a proposed improvement to land, second tier questions relate to construction specifications for the improvement and third tier questions relate to bidding parameters for the construction project. The process also queries an administrator 105 of the construction project with active first tier questions regarding ownership of the improvement, accepts and stores answers to the active first tier questions and compares the stored answer to the predetermined answers.

The invention further includes identifying first, second and third tier questions that are irrelevant based on the answers to the first tier questions and deactivating the identified irrelevant questions. The system and method can query the administrator with active second tier questions regarding construction specifications, accept and store answers to the second tier questions and compare the stored answer to the predetermined answers, identify third tier questions that are irrelevant based on the answers to the first and second tier questions and deactivate the identified irrelevant questions and query the administrator using active third tier questions regarding bidding parameters and accept and store answers to the third tier of questions. Based on the above the system and method can configure an online bid process based on stored answers to the first, second and third tier questions.

In some embodiments, the system, method and product can automatically communicate requests for bids, can automatically configuring a website, can automatically retrieve at least part of electronic construction specifications, can configure a bid acceptance administrative format, can automatically configuring a request for bid process and can automatically set up and administrated a website based on the stored answers. In some embodiments, the system method and product can prioritize first, second, and third tier questions, giving a highest priority to questions that have at least one answer that render a largest number of first second and third questions irrelevant.

In some embodiments, the system method and product prioritizing the first, second and third tier questions, giving a higher priority to questions based on predetermined data indicating that a particular question has a high probability answer and said high probability answer renders questions inactive. The questions can be configured such that the answers to the questions are yes, no, true false and undetermined. After configured, the system can solicit and receive bids online and automatically checking the bids for compliance. The system can automatically notify a bidder when the bidders bid is not in compliance and can electronically post winning bid and non-winning bids based on how the system is configured and automatically sending electronic data defining the improvement to a regulatory entity to facilitate a permitting process. In some embodiments, the system can monitor online activity to determine compliance of the activity with respect to predetermined guidelines.

In some embodiments, a method for administrating a construction project can include queering a user with questions in a hierarchal order, via a user interface, to determine owner parameters, bidding specifications, asset management specifications, design parameters, procurement parameters and constructions specifications. The system can accept and store answers to the questions retrieving one or more process compliance templates in response to the stored answers automatically generating phases of the project, each phase having scheduling and compliance parameters, configuring automatically an online project management process on a website based on the stored answers where the configuring to include at least one of configuring an electronic mailing list, construction specification access information, bid submission parameters, bid acceptance parameters and contractor compliance parameters.

The process compliance template can include a comprehensive project checklist, a bid process template, a construction specification process template, a financing process template, a government compliance template and a quasi-government compliance process template. The system can create predetermined control intervals and determine if sufficient data has been received prior the predetermine control interval and responsive to said predetermined control interval can generate automated electronic alerts if sufficient data has not been received.

In yet other embodiments, the system can query and register visitors to the website and acquire visitor information and classify a visitor based on the acquired information. Visitor classifications can include owners, architects, engineers 110, general contractors, subcontractors, and suppliers to name a few. The system can also provide or restrict access to and display predetermined system features based a visitors classification and identity. Access can also be provided and displaying for system features based on an occurrence of one or more pre-determined events such as timing or entering into a new phase or part of a project. In some embodiments, the system can log activities performed by visitors to the website and generating a notification if it is determined that a website activity fall outside of a predetermined set of guidelines.

DETAILED DESCRIPTION OF EMBODIMENTS

The following is a detailed description of embodiments of the disclosure depicted in the accompanying drawings. The embodiments are in such detail as to clearly communicate the disclosure. However, the amount of detail offered is not intended to limit the anticipated variations of embodiments. The description that follows is for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the disclosure may be practiced in versions that depart from these specific details. In certain instances, descriptions of known apparatuses, systems and methods are omitted so as not to obscure the explanation, teaching and description of the claimed embodiment with unnecessary detail. The teachings herein are intended to cover all modifications, equivalents, and alternatives falling within the spirit and scope of the present disclosure as defined by the appended claims.

The teachings herein disclose many improvements to the ways in which all phases of a construction projects and processes are defined, administered, monitored and managed. The disclosed embodiments disclose how to in increase efficiency, reduce costs, decrease liabilities, and improve the quality at each stage of a construction projects from a desire to construct or inception to the award of an occupancy permit for all involved parties. The disclosed administration and management systems and methods allows general contractors 112-116 cost effective measures that provide more time to submit a final bid, and allow for the inclusion of a change to a bid in near real time possibly seconds before the deadline.

It can be appreciated that the disclosed embodiments greatly reduce the cost and resources required for and/or consumed in a bidding process for all involved by reducing the amount of paper used, the amount of man hours, the amount of travel etc. Thus, the disclosed processes are ecological friendly or green in many ways. The disclosed embodiments make it much more efficient to manage all phases such as the administration of bids for all involved and correspondingly reduce waste of our precious natural resources and reduce pollution which is destroying our environment.

There are a few online systems that support certain phases of a construction process however they lack features required to make effective and efficient tools that allow for cradle-to grave administration and management for construction management. For example websites http://ctca.unb.ca/CTCA1/ETendering.html, http://www.allbusiness.com/government/government-bodies-offices-us-federal-government/6292988-1.html, http://www.smartsourceportal.com, smartsourceportal.com, and http://bizinformation.co/www.smartsourceportal.com provides systems that are less than perfect for many reasons.

Some "printers" specialize in posting drawings on-line for use by prospective bidders as part of a bid package. This service is often referred to as an online plan room 140. For example, Citadon Inc., Contractors Register, Inc.'s BB-Bid, F.W. Dodge's Dodge Plans and ISFQT, provide an on-line drawing access service that is tailored to architects 106, engineers 110, suppliers and contractors 112-116. Many printers or reprographers have adopted online plan rooms 140 to provide such services in most major cities. Since, the vast majority of subcontractor (118-122) s lacks the technology to download and print such plans. Often on D sized drawings, reprographers contract to provide these online plans rooms for larger construction projects. However, these plan rooms 140 are severely limited in what they provide as generally they are limited to the distribution of documents to requesters of such documents. Currently, there are no solutions for inefficiencies in many of the smaller processes that make up an overall construction process.

Another example of a construction project assistance entity is, Bidx.com. Bidx.com provides web site that serves to facilitate the bidding process for the department of transportation (DOT) for a few states. Contractors (112-116) utilizing this website to fill out a bid sheet and submit it to the participating agencies. However, this process lacks many features required to provide efficient and robust administration for a bidding system. For example, this service only assists with a particular phase of a construction project and only caters to a small custom situation or only has a narrow application, i.e. to DOT projects or travel related infrastructure. In addition, this system is not paperless and serious resources are consumed by this process.

Remarkably, the disclosed embodiments provide paperless on-line administrative and management solutions for each phase for all types of construction projects. Such unexpected results are achieved by a system that integrates and communicates between multiple parties and sources, creates processes guidelines based on a set up configuration and provides different features and functions for each phase of the project based on input parameters. Thus, the comprehensive, universal construction administration and management system disclosed provides each party to a construction project with a one stop, on-line site with all of the tools necessary for efficient and effective communication, administration and management for each phase of an entire project regardless of the esoteric or diverse requirement of a particular project. Such a comprehensive and universal approach provides significant efficiencies over current systems and processes.

Accordingly, the disclosed embodiments provide for effective and efficient administration and management for phases of very diverse project types or projects with very diverse requirements. For example, based on initial input, set up and configuration the disclosed embodiments can be tailored to efficiently manage and administrate a construction project for a nuclear missile silo in New York City or when configured as such for a homeowner's bathroom remolding project in remote Alaska.

In some embodiments, based on initial user input and set up regarding project parameters such as private or government ownership, guidelines, local requirements, contractor requirements, bidding requirements etc., the system and method can automatically generate an administrative/management template with legal documents and a communication flow structure that is tailored to the project. The template can dictate the flow and rules for communication between parties in near real time, including bidding notices, or just notices to parties based on a particular set of circumstances, such as schedules meetings, deadlines, compliance and non-compliance, change notices, where the system can ensure that all communications and information associated therewith complies with all legal and government requirements. During set up or configuration the user can work through and answer a series of menu driven questions using drop down menus to respond to the questions and the system can automatically set up the required documents and notices, contact lists, schedules, requirements guidelines etc. such that the system can notify the user and give a user a daily check list during the process such that a novice user can administrate and manage the process even though they do not have an in-depth knowledge of the process, where the system will make sure that the user complies with thousands of requirements helping the use to avoid costly pitfalls.

In some embodiments, the system and method can based on the initial configuration provide the user with hard rules, soft rules, guidelines, tradeoffs, recommended procedures etc., that will dictate the publication of notices, schedules for activities for each phase, requirements etc. for a particular segment of a particular phase (possibly via e-mails) for a specialized type of construction project. Thus, when set up appropriately, the disclosed embodiments allow for automated and/or semi-automated administration and management of critical and non-critical aspects of each phase of most every type of project.

The disclosed embodiments can automate provide checks and balances as part of such administration, can provide suggested activities, notifications regarding actual or potential violations, abnormalities or potential oversights and in addition providing data corresponding to such to management teams thereby avoiding potential issues greatly reducing costs and improving the effectiveness of such management for each and every phase of a project for all types of construction projects. In addition the disclosed embodiments can monitor progress and activities to detect fraud and provide compliance reports to ensure compliance with esoteric regulations.

The disclosed system can support all phases of a construction project and is adaptable to project specifics and allows an inexperienced user to effectively administrate the most esoteric legal and construction requirements for nearly every type of construction in an effective, efficient, secure, reliable, robust, trustworthy fair and credible manner. It can be appreciated that in current bidding processes, each bidder on each construction bid consumes an average of tens of pounds of paper, spends hundreds on man hours for manual delivery and burns at least a tank of gas in submitting a single bid. The disclosed embodiments make travel and paper virtually unnecessary in a construction bidding process and such novel improvements are environmentally friendly because they reduce consumption of natural resources such as trees and fossil fuel and reduce waste such as carbon emissions from cars traveling to the bid locations and reduce paper waste in our landfills.

Referring to FIG. 1 a high level block diagram of a bidding system 100 is depicted. The system 100 can include a host system 102 that can be accessed via a single URL such as e-bidletting.com. An architect 106 acting as a client to the host 102 can via a network 104, such as the Internet, access the host system 102 and to set up a construction bidding, monitoring and awarding project. The host 102 can be a server that connects to the Internet such that the host 102 can administrate the construction project by communicating with any number of client machines. The host 102 can provide and restrict access to various data and operational features provided by the system or by the host 102 based on the identity and role of each client (106-124).

Clients 106-124 can include an architectural firm 106, an administrator 105, and an owner 108, an engineering firm 110, general contractors (112-116), subcontractor (118-122)s and material supplier 124. Although only a few of these entities are shown the system can accommodate any number of clients of entities. Generally, the host 102 can identify clients and verify that any and all clients 106-124 are authorized to interact with the host 102. Further, host 102 can provide access to data stored or administrated by the host 102 and can and restrict access and functions available to clients 106-124.

The auditor 130 can be resident on the host machine 102 or it can be remotely located. As will be explained below the auditor 130 can act as a supervisory and security type system. Auditor 130 can be configured for each project depending on the requirements placed on the particular project. For example, a government office project will typically have much stricter rules or processes than a parking lot expansion for a small business. Thus, the auditor 130 can be set up to monitor all activities associated with the process and can notify the owner 108 and architect 106 when an abnormality or breach of security occurs in many aspects of the system/process.

One feature that the monitor/preventer 132 can provide is deterring the bid deadline time and making sure that a bid is not allowed unless it meets all of the parameters or requirements. For example one requirement set by the administrator 105 might be that all bids are received in their entirety by a particular time. If a bid is received after this time then it will not be considered. In some embodiments, the monitor/preventer 132 can prevent anyone from turning the clock forward such that the host 102 would reveal any of the bids prior to the deadline. Turing the clock forward and backward is also not allowed by the software.

To start, an investor 141 or owner 108 will typically consult with architect 106 to develop a project definition and project parameters that can include requirements, limitations, specifications, materials, preferred/qualified bidders, bonding requirements, level of and type of auditing, addendums for the project etc. When a basic concept of desired project parameters is determined the administrator 105 can use graphic user interface (GUI 136) provided by system configurator 136 to set up the system configuration and determine how the system will operate to administrate phases of the project. The configurator 136 via the GUI 136 can prompt the user/administrator 105 with questions regarding the basic framework/requirements for administrating the project including project parameters and design and construction requirements. The GUI 136 can provide drop down menus or with the ability to select "canned" answers from a list of prospective or possible answers.

The questions can be organized to minimize the number or answers required to configure the system. For example, the first question might be what kind of project is this, while providing the following selections, PUBLIC, PRIVATE, and GOVERNMENT. It can be appreciated that if GOVERNMENT is selected a rules applicator 138 can automatically set up a bidding process that complies with all of the current regulations that might include notice requirements, timing requirements, bidder requirements etc. In contrast when PRIVATE is selected by the administrator 105 the rules applicator 138 can set up an administration process having very favorable conditions for a private entity or person such as restricting bids to entities with a stellar financial and safety history, an unorthodox timeline, etc. As part of the set up configuration the construction data can be quantified and posted.

Figure 2:
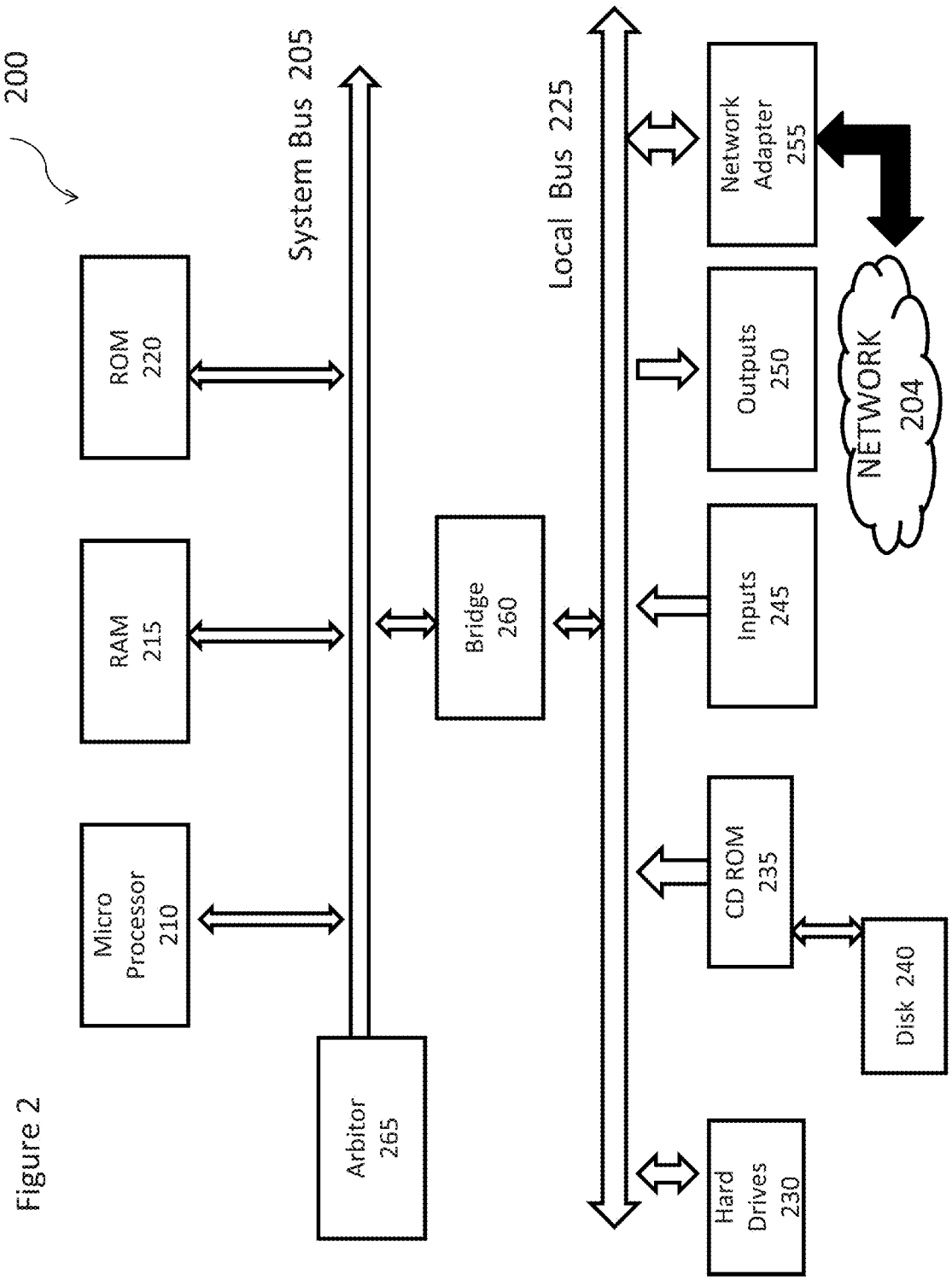
FIG. 2 is a block diagram of a computer typical of one that could be utilized to implement the system and method disclosed herein.

Various set up questions that could be posed are illustrated on FIG. 2. It can be appreciated that every feature and option disclosed and discussed herein can be invoked, implemented or provided either automatically based on a user set up (such as designating the project as a government project) based on answers to feature specific questions.

Thus, according to the what construction parameters/requirements are entered during set up, when the project parameters are set up and the project data is ready it can be posted and engineering firms such as engineering firm 110 can bid on the engineering work for the project. Often the architect 106 and owner 108 will hire an engineering firm 110 by the hour and not have a bidding process for such services. The disclosed system has significant flexibility in allowing the administrator 105 to set via set up interface 136 whether this part of a process occurs or does not occur and if it does occur how this phase is administrated, for example, posting or providing an invitation to bid via a social media 142, a predetermined contact list, via publications etc. After the definition is posted, engineer 110 possibly having restricted access based on the initial set up/configuration, can review the engineering specification loaded into the database 124 by the architect 106 and can in some cases have the ability to modify or add details to the posted project. Such a definition can be stored in a database 126. The database can be managed by the host 102 and activities performed on the database 124 can be monitored by the auditor 130 based on the definition.

After the owner 108 and the architect 106 agree at least in part on the project definition, and the engineering 110 is substantially complete an administrator 105 can post the construction project. Often the architect 106 will perform as the administrator 105 however, using the disclosed easy to use system 100 the owner 108 may elect to use an entity that is much cheaper than an architectural firm 106 as the administrator 105. Posting of the project can include placing the request for bids on many different websites. Posting can also include sending e-mails to previous bidders, preferred bidders, contractors (112-116) on an e-mails list etc. Then contractors such as contractor 1 112, contractor 2 114 and contractor N 116 can all login and access the project definition on the database 124. Likewise, subcontractors (118-122) and material suppliers 124 can set themselves up and interact with the host 102 and can access project information.

Based on the set up, the owner 108 or investor 141 in the project can have limited access to some of the data in the database 124 via the host 102. The auditor 130 can act as and can be controlled by an independent agency such as a certified and bonded accounting firm or a gamming audit firm. The auditor 130 can provide independent certification that the disclosed process is occurring and has occurred in compliance with the all defined process, procedures, policies, laws guidelines and specifications.

Based on the set up, the auditor 130 allows the liability of administrating a fair legal bidding and awarding process to be placed on a third party who is disinterested in the process. Nearly every aspect of the process can be logged such that if there is ever a question as to compliance and fairness such fairness and compliance can be easily provided by the auditor 130. Such an auditor can prove very valuable to ensure compliance with governmental policies, procedures and local, state and federal laws. The host 102 can access a clock and an intrusion monitoring system 132. Monitor 132 can monitor transactions of the host 102 and logins and other communications between the host 102 and all clients that access and attempt to access the host 102.

In some embodiments, based on the set up each engineer's 110, contractors (112-116), subcontractor's (118-122) and material supplier's bid can be verified or bids can be randomly verified by an independent accounting firm using the auditor 130. Based on the set up, the monitor 132 can access database 124 to acquire auditing parameters and can implement certain processes to ensure a fair and quality process. For example, monitor 132 might flag a bid as "non-responsive" if a bidder does not submit a proper bond and/or is a bidder does not acknowledge the addenda or other requirements such as minority bid entity (MBE) or minority bid winner (MBW) participation if such a parameter is set by the administrator 105.

Based on the set up, In some embodiments, a subcontractor (118-122) can have the ability to upload their bid to the host 102 and as part of the process select a time for the bid to be auto-delivered to one or more general contractors (i.e. contractors 112-116). This allows a subcontractor (118-122) to avoid delivering their bid too early to general contractors (112-116) who can participate in bid shopping if a subcontractor (118-122) submits their bid to a contractor 112-116 prematurely.

The disclosed embodiments provides Contractors (112-116) who do not want to use the paperless online system with the option of hand delivering their bid to the administrator 105s office using the traditional manual paper delivery system. In this situation, the administrator 105 can open the hand delivered bids then enter the important details of the bid into the host 102 via a client machine, typically at an architect' form 106. In some embodiments, after the administrator 105 completes the manual entering of all of the hand delivered bids, at the touch of a single button all of the electronically submitted bids can be revealed on a website controlled by the host system 102. Such a posting of all of the bids on-line will help the credibility of the system and the functions of the monitor 132 and auditor 106 can provide time stamps for all bid entries such that all bidders can be ensured that there is no collusion.

After the administrator 105 manually enters a bid the monitor 132 can check to see if all of the required fields/parameters have been entered before the bid is officially accepted. For example, the monitor 132 can query the administrator 105 to determine if the manual bid was received on time if the bond is acceptable, if all the numbers have been entered. It can be appreciated that all contractors (112-116), subcontractors (118-122), architects 106, engineers 110 and owners 108 can view all of the letting activity online as if they were present at the actual letting and nobody will be required to travel to the bid opening as with current processes. Such a savings is much more efficient and environmentally friendly as compared to current processes thereby saving the environment.

It can be appreciated that each client, contractor (112-116), subcontractor (118-122) etc., can have a general user ID and log in password to access and manage their account. In some embodiments, each user will have a unique password for each project. The monitor 132 could detect if the right bid is put in front of the right bid request. The monitor 132 can also randomly generated a unique password for a user for a project for a specific project or bid. All communications can be encrypted to ensure security and the auditor 130 and the monitor 132 make sure that such encryption occurs during communication. In some embodiments, there can be different encryption level for user and for each project.

If the bid is for a public job, the bids can be posted on a government or other public run website depending on the type of project for public viewing. In some embodiments, when the time for letting of the bid occurs all parties of record such as the architect 106, owner 108, bidding contractors 112-122 and material suppliers 124 can be notified via email or text to log on to the controlled by the host 102 to view the letting "live" and review the results as they unfold. In some embodiments, requests for bids, results from public bids etc., can be posted on social media sites 142 such as twitter, Facebook, LinkedIn etc. providing additional efficiencies project management efficiencies.

In some embodiments, the architect 106 can request the contact information for the low subcontract bidders 118-122 and post them on a website for each project so the contractors (112-116) can see who the successful subcontractors (118-122) were for the project. This information is very useful for contractors (112-116) because subcontractor (118-122) bids drive the amount that will be bid by the contractors (112-116). Thus, in future bidding efforts, a contractor (112-116) could purchase historical subcontractor's (118-122) bid data to see what contractors' (112-116) provide the lowest average bids and who a general contractor (112-116) might team up with for future bids.

It can be appreciated that a contractor (112-116) that has access to historical subcontractor (118-122) bids will likely be more successful at winning jobs. A contractor (112-116) might also want use the data to learn or infer why a particular subcontractor (118-122) who was invited to bid did not provide a bid. Such a posting of subcontractor (118-122) bids also allows the contractors (112-116) the opportunity to contact the low subcontractors (118-122) and see why they did not receive a bid from this subcontractor (118-122).

It can be appreciated that the auditor 130 and the monitor/preventer 132 ensure that no bid information is available to others and no bids can be opened before the predetermined bid date. In addition, auditor 130 and monitor/preventer 132 can ensure that if a bid is incomplete, for example, the bid bond has not been approved, that the bid will not be considered nor awarded.

In some embodiments, a bond that is submitted directly into the system by a bonding agency 150 or the bond can be scanned and entered into the database 124 for a particular bidder. The administrator 105 can review the bond any time after it is tendered and can check boxed to indicate that it is approved or not approved. If it is not approved e-mails can be generated and sent to the corresponding bidder and the bonding agency 150 indicating that the bid bond is not in compliance with the contract documents. The architect 106, the owner 108, the bonding agency 150 and the bonded entity, typically a contractor (112-116), can all see the bond and associated contents and see its status and if it has been approved at any time after it has been submitted. The bid bond status can be electronically confirmed with the bonding agency 150 and the bid bond can be submitted electronically from the bonding agency 150 for efficiency and the avoid errors and miscommunications which might disqualify a bid. The monitor preventer 132 can have a controllable time window where the administrator 105 cannot manually enter a bid before the letting time and cannot enter a bid a predetermined time after the bid deadline has passed.

Depending on the owner's 108 desires and how the system is set up prior to the bid deadline clients such as the owner 108, architect 106 etc., can see what contractors (112-116) have submitted bids and possible what sub-contractors have submitted bids. It can be appreciated that the system is very configurable and based on these settings the monitor 132 and auditor can implement such process parameters. In some embodiments, a subcontractor (118-122) can be associated with a contractor (112-116) and each subcontractor (118-122) can have the ability to have a sub-login under the contractors (112-116) control parameters. This allows a subcontractor (118-122) to perform an underlying bidding process. Either way the system 100 provides features that allow a subcontractor (118-122) to submit their bids to general contractors (112-116) in the following manner; subcontractors (118-122) and material suppliers to upload their proposals to the website to be delivered via email to general contractors (112-116) at a specified time for analysis. This feature allows the subcontractor (118-122) to deliver bid to contractors (112-116) that do not shop or sell bids to other vendors in a timely manner and deliver bids to general contractors (112-116) who have a history of bid shopping at the last minute, which will help to protect the subcontractor (118-122) or material supplier's bid from being shopped and after review the bid could be electronically inserted into the contractors (112-116) bid into the database 124. In addition the system 100 can provide a plan room 140 to facilitate communications between the contractor (112-116) and its subcontractors (118-122). Such a feature allows a contractor (112-116) to post instructions processes, procedures, agreements and requirements to the subcontractor (118-122). The agreement can be automatically generated based on the parameters and rules that are set up for the bidding process. Thus, the contractor (112-116) will be informed if in this particular project the contractor (112-116) will be allowed to select contractors (112-116) on line and if subcontractors (118-122) will be allowed to automatically post to the contractors (112-116) bid for example.

As stated above the auditor 130 can monitor all activities, but cannot access the contactors (112-116) bid until after the bid date and time has passed. From a remote location the administrator 105 and others can generate reports on the activity of the host 102. Such monitoring can detect, for example, if any events take place prior to when they should according to the original parameters. After the project is awarded, the auditor 130 can verify that bidding process was carried out in accordance with the designated parameters and that the process was fair and went according to the guidelines.

In some embodiments, and as defined by the parameters, the owner 108 and the architect 106 can see what contractors have bid on the alternates(s). As part of the parameters, the architect 106 or owner 108 can generate a list of approved or alternately not approved contractors (112-116) and subcontractors (118-122) to control who actually submits a bid or to control who will be awarded the bid.

Based on the set up, in some embodiments, the administrator 105 105 can enter a list of entities who will receive the bidding materials electronically. In this list, each entity can be assigned a weight or a weighting factor (favoring or non-favoring) for each general and/or subcontractor (118-122). The weighting factor can be used as a multiplier for the bid amount to determine the winning bidder. For example, a favored bidder might be 30% higher but the weighting would give the favored bidder the award. Likewise, the low bidder would be adjusted down by the weighting and even though the lowest bidder they would not be awarded the bid. Such weighting could be used when government requirements for government contracts might need to be complied with.

In some embodiments, data harvester 152 can process transactions, compile data, create metadata and harvest data resulting from one or more bidding awarding and construction processes. For example, the data might indicate how many times a contractor (112-116) has defaulted, history of a bonding agent, or how many lawsuits, complaints and OSHA violations a contractor (112-116) has. Further the data harvester 152 could provide a board for owners 108 and architects 106 to post comments, complaints, and rate the contractors (112-116), subcontractors (118-122), architects 106, engineers 110 and material provider's performance.

Some embodiments include an online plan room 140 that provides the invitation to bid and provides all of the information needed for someone to provide a bid. The plan room 140 can also act as a match maker that allows subcontractors (118-122) to get in touch with contractor (112-116). Plan room 140 can facilitate the request for quotation, request for proposal, request for qualification, requests for information, notice of pre-bid meetings, notice of addendums, bid date extensions, reminders to bid, the notice of award, a notice to proceed and miscellaneous memos. The plan room 140 can be implemented with secure communications.

Generally the plan room 140 can provide a centralized communication hub for contractor (112-116) and subcontractors (118-122) to receive and download project documents. The monitor 132 and auditor 130 can also provide quality control services for the plan room 140. For example, the monitor 132 and auditor 130 can detected who has been notified of and who has responded to a bid time extension. The plan room 140 can reduce risk of costly project delays or failure due to mismanaged subcontractor (118-122) communication. Data acquired by the data harvester 152 can be stored in the database 124 and such information can be utilized to identify and prequalify subcontractors (118-122) and others.

The plan room 140 allows owners 108s, architects 106, and contractor (112-116) to distribute project information to subcontractors (118-122), suppliers, and other members of a project team via the Internet. Allowing users to view download, and print any or all pages in a project file provides an improved process over traditional systems.

The system 100 allows for increased bidding efficiency on new projects, easy access to all project information throughout the life of the project without ever leaving the office. Additional benefits include new lead generation sources for new projects, instant e-mail notification of addenda to existing projects, and quick downloading of construction plans and specifications. The plan room 140 allows subcontractors (118-122) to efficiently electronically locate, where they once had to physically sift through mountains of project drawings, projects and tasks that they are interested in providing a bid. Historically, it could take days for a subcontractor (118-122) to find a project that the subcontractor (118-122) was interested in bidding on. The project room 140 provides subcontractors (118-122) with a much easier way to view drawings online and a better way to distribute electronic drawings and notes to subcontractors (118-122).

Contractor (112-116) can use the plan room 140 to distribute plans to potential subcontractors 118-122, and contractors (112-116) have an incentive to set up the virtual rooms in the system 100. In some embodiments, the architect 106 or administrator 105 105 can upload drawings, specifications, requirements, addendums etc., to the plan room 140 which can be an independently hosted website, where this information is stored for later viewing by participating parties such as subcontractors (118-122) who have received a bid invitation via e-mail or fax. Prints and specifications can then be downloaded from the site by the subcontractors (118-122) or ordered as hard copies via a local print house. In some embodiments, the reprographer can be cut out of the equation by downloading the plans by the subcontractor (118-122).

The disclosed system 100 can be monetized in many ways. For example, the system can charge for providing passwords or to access the system. Such a subscriptions would be much less expensive that the cost of printing the plans however. The disclosed system 100 can provide an "open door policy" for subcontractor (118-122) participation and can also provide estimating and project management tools online.

The plan room 140 helps subcontractors (118-122) learn of more jobs over a greater area. The plan room 140 can increase the awareness to the bidding community of the jobs being bid. Whether accessing the plan room 140 from a desktop computer or relying on a print house to produce the documents, the plan room 140 can efficiently transfer plans for bidding and estimating. The plan room 140 can minimize, and the auditor 130 can reduce the cost of errors and omissions for the bidding and awarding process by insuring that all contractor (112-116) and subcontractors have acceptable and viable bid packages according to the system setup. The disclosed system 100 can reduce litigation risk by controlling document access, distribution and storage. Depending on the control setting the administrator 105, architect 106 and owner 108 can know who has received and viewed specific documents.

The disclosed system 100 can reduce cost associated with printing and distribution of bid documents and bidders and suppliers are provided with 24-hour, 365-day access to project information. The plan room also provides users with keyword searchable specs. The plan room 140 can have selectable rationality where project information is provided based on a user's selection of on a local, regional, statewide or nationwide basis. The plan room 140 can be accessed from an office, home, or remotely anywhere that there is Internet access. For suppliers, the plan room 140 can provide searchable CSI codes that can help material suppliers 124 locate projects that require the manufacturer products.

The database can seamlessly share information with a private contractors (112-116)'s page that a contractors (112-116) can utilize to manage their preconstruction efforts of their private bid work. This page provides contractor (112-116) with tools to manage estimate and bid on project where information is readily available. The database can also provide software tools allowing quick and accurate performance of on-screen takeoff and estimating functions.

Referring to FIG. 2, a computer 200 suitable for executing the disclosed embodiments as a host 102, server, client or workstation is disclosed. Computer 200 can be formed by several components that are connected via a system bus 205. The system bus 205 can allow the system to be easily scaled. One or more processors 210 can be utilized to control operation of the computer 200. Random access memory (RAM) 215 can be utilized by the microprocessors 210 for working memory, and read only memory (ROM) 220 can be utilized to store basic code and to boot the computer 200 on start up.

The system bus can be connected to a local bus via bridge 260. Several peripheral units may be clustered around a local bus 225 via interfaces. The computer 200 can also include mass memory that consist of one or more hard disks 230 and a compact disk (CD) drive 235 for reading CDs 240. Moreover, the computer 200 can include input units 245, for example, a keyboard and a mouse, and output units 250 such as a monitor and/or a printer. A network adapter 255 can be utilized to connect the computer 200 to one or more networks 104. Each microprocessor 210 and the bridge 260 can operate as a master agent requesting access to the system bus 205 and utilizing the system bus 205 to request and receive information. Arbiter 265 can manage and grant access to the system bus 205.

Figure 3:
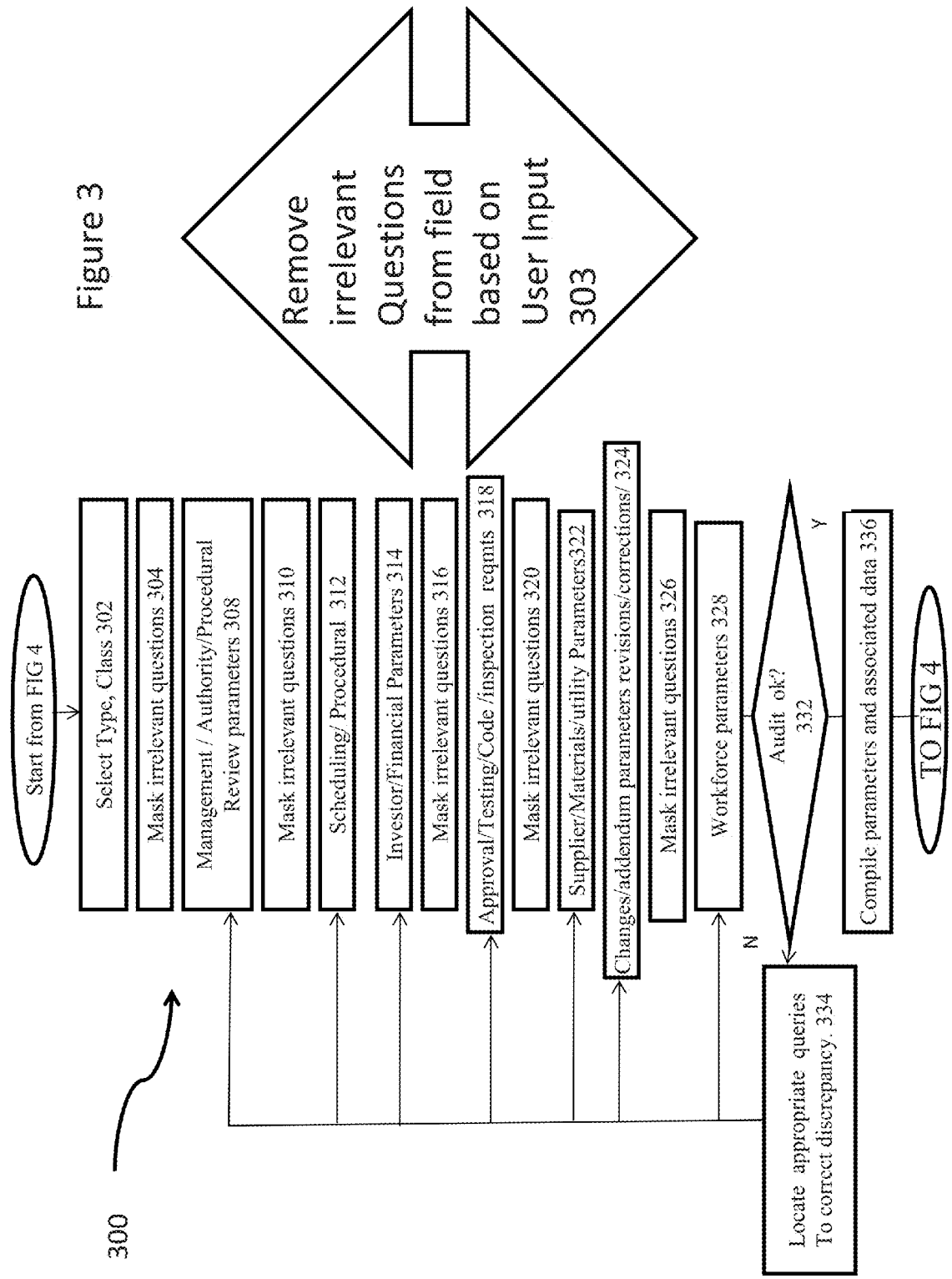
FIG. 3 is a flow diagram depicting a process for setting up a framework or a template process that could be utilized to administrate and manage a construction project.
Figure 4:
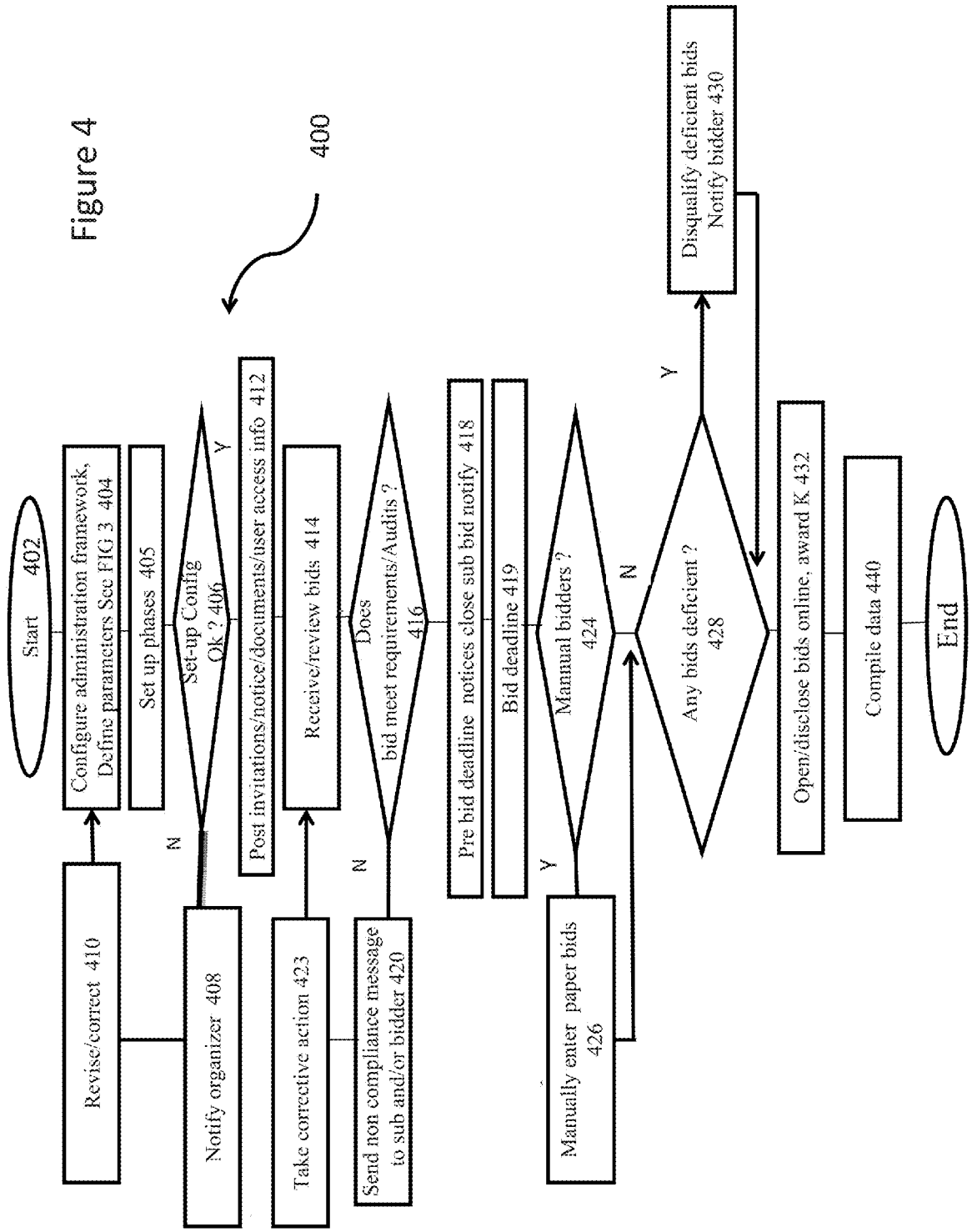
FIG. 4 is flow diagram illustrating a process for administrating a land improvement project.

Referring briefly to FIG. 4, a process for a network 104 based construction project administration process 400 is disclosed which can provide project administrator 105s/organizers with tools, a framework and guidelines for managing one or more construction project/process, from inception to certificate of occupancy and beyond or "cradle to grave" and compile and provide valuable historical data. The process 400 can start at block 402 and proceed to block 404 where the administrator 105 can set up the framework of the project by answering questions and providing parameters. Thus, the administrator 105 can configure and initiate the process utilizing question/query driven graphical user interfaced or a menu driven question and answer session via a graphic user interface. The set-up configuration process depicted in block 404 is further detailed in the flow diagram of FIG. 3.

Referring to FIG. 3 a flow diagram that discloses a process regarding administrative framework set up of an administrative and management tool that can be utilized to organize, manage, administer, provide quality control, ensure compliance, and measure the success of the project and sell valuable data resulting from a land improvement project. The system can have hundreds of questions each of which can dictated the inclusion of steps in the administration of a project and what occurs at each of these steps. The questions can be grouped based on how the answers to these questions affect the inclusion and modification of one or more steps. Thus, there can be a relational database of hundreds of questions and related to each question can be a list of questions (based on an answer to the question) that become irrelevant with the particular answer. Thus, for each questions the can be a determine number of questions in the data based that become irrelevant when a particular answer is acquired. Thus, the questions can be presented in an order where an answer to the first question will make the maximum amount of questions in the data base irrelevant thus; the number of latter, follow up questions can be minimized. This improves the efficiency of the system which is important due to the volume of the questions required to set up such a complex process.

As illustrated by block 302, the organizer can be queried and can respond to a group of questions about the type/classification of the construction project, hereafter referred to as the "Project." In some embodiments, the first query can be related to the classification of the Project as configured. In some embodiments, there can be four classifications government, public, private or a hybrid thereof and if the project will be a design-build project. As illustrated by block 303, In some embodiments, the system at any stage of the process can order/reorder/reconfigure the questions or queries provided to the organizer such that the initial or first questions to be asked minimize the number or questions that need to be asked in later stages of the process.

Thus, the initial questions are questions that make the most questions in the system irrelevant or eliminate the need for answers in the most downstream or minimize the overall number or questions to be asked. For example, an answer to the first question (which has five canned (drop down) answers, i.e. what is the classification of the project) eliminates the need to ask many additional questions (sub-questions) such as if there is a need for compliance with specific government programs, guidelines, processes, laws etc., and more particularly what programs. Thus, if a government program is selected the next questions might be what particular government or quasi-government requirements must be met or what level of government regulations or guidelines must be complied with. The selection might include subcategories of government guidelines or regulations i.e. city state federal, military etc. It can be appreciated that, generally most Projects having a scope and magnitude of the Projects contemplated herein will have several phases, sub phases, processes, work orders, supply deliveries, items etc. in common and thus, a Project administrator 105 can be presented with a list of phases sub-phases etc. and can select if this phase is applicable and need to be included in the overall process when setting up or configuring the system. Such a user friendly yet comprehensive system set allow for the disclosed system to efficiently and effectively manage a Project cradle to grave.

Selection of the hybrid classification allows an administrator 105 pick and chooses specific sub guidelines for one or more of the hard guidelines or base obligations for each classification. As illustrated by block 304, based on the classification selected by the organizer, the system can remove irrelevant/irrelevant questions from the query process. For example, if the organizer dictates that the project is a design build project the number, subject matter of the questions asked in the next block can be significantly changed, reduced and possibly even eliminated.

As illustrated by block 308, the organizer can be queried as to parameters as to who has specific management tasks, who has specific authority, who has specific procedural review and what of such tasks and authority is delegable. As stated above a "YES" answer to a question of is this a design build can answer many questions as to the management/authority/procedure and review parameters can eliminate. For example, in a design-build configuration it would be known who wins the bid will be handling subcontractor's issues, possibly financing arrangements, and what functions are typically provided by the winner of a design build type project. In addition, in a design-build the winner will provide specific functions and have the authority to make decisions at specific levels and each of the role/relationship between the design build entity to the owner 108 can be set up based on a "standard template" that defines their relationship during each phase of the project.

Also included in the queries of block 308 can be queries that define the legal relationships/requirements/template clauses/agreements for each phase of the project. After the management parameters are acquired, template documents can be located, and loaded or generated and provided to the parties (owner 108, contractor, sub supplier etc.) for review, this can automatically remove or cycle steps historically preferred compassed individuals. This step can also include the locating and compilation of documents such a lien wavers and when they need to be executed and by whom and implementation of tools/checks and balances that make sure that the process complies with legal requirements, concerns or obligations, and thus, can reduce legal liabilities in all phases of the project.

Per block 308, the system can provide a set or queries to the user and acquire and store parameters about owner 108, the management, quality control, project review and the overall procedure or process including the owner's 108 involvement in the project. The project and all of the parties involved with the administration can be assigned a name or a unique identifier and users, owners 108, prospective bidders etc., can be defined and assigned a unique user ID and passwords.

These parameters can include, if the end improvement will be a lease/tenant type, additional special requirements, warranties, warranties beyond what is required by law, governmental jurisdiction for permitting and inspection, legal requirements, confidentiality agreements, intellectual property arrangements such as copyright agreements, business relationship affidavits, project agreement type, corporate project acquisition team requirements, the leadership in energy and environmental design (LEED) requirements, non-Collusion requirements, special requirements for government work, standard occupational classifications required (SOC)s, special government specifications, government agency online requirements, and additional definable fields to allow the organizer different options and checks and balances in the process.

Other parameters might include how the invitation to bid will be disclosed published, advertised etc. the organizer can be asked about preferences for procedural parameters. For example, the organizer can be queried and can answer questions regarding the bidding process, which can include a date, time, requirements, procedure, documentation etc. that outlines instruction for prospective bidders, where such input can be utilized as outlined for advertisements of a bid, bid requirements, special bidding instructions, online bidding requirements, whether the bidding is a reverse auction bid, bid delivery instructions, unit cost prices, submittal exchange fees (this is a process where the submittals are submitted electronically, on line access information and requirements to a third party for facilitation. This is required by some state agencies), pre-bid meeting attendance requirements, alternate pricing, subcontractor disclosure requirements, bidder track record-experience-safety record, pre-qualification document, special project requirements, post award status report, meeting requirements, project close out requirements, close out document format or processes, special project requirements/procedures, meeting minutes distribution requirements and milestone dates. Additional parameters regarding the bid packages, internet sites for access to the prints, the let bids, and any access to information and submission of information can be selected by a user and acquired by the system at this stage. Bidding parameters can include a bid deadline, a bonding requirement, access to data and timing of access to data, viewing of data, password restrictions, minority requirements, bonding requirements and bonding approval requirements, bidders names (approved and excluded), activating a weighting system, what plan rooms the request for Quote (RFQ) will be posted, the websites where the RFQ will be posted and in what format, what contractor (112-116) and subs will receive the RFQ and who gets notified if the bid is not in compliance.

Additional bidding parameters include unit cost pricing, non-collusion agreements, addenda acknowledgement, subcontractor lists, women's business enterprises (WBE) and minority business enterprises (MBE) acknowledgement, alternate pricing, contractor license required, acknowledgement of liquidated damage clauses, schedule requirements, project phasing, LEED rating requirement, special submittals, insurance requirements (in addition to what is required by law), references, financial stability, Construction requirements can include the contract documents; specifically drawings, technical specifications, general conditions, supplemental general conditions, addenda advertisement for bids, bid form and form of contract. Regarding the bidding parameters and the administrator 105 can be provided with drop down menus regarding different classes of bidding.

For example, the administrator 105's graphic user interface can have template selections such as a private project, an open public project, a quasi-government project, and a government project. Each template will set the parameters such that the bidding process parameters are set such that they will comply with the applicable regulations. Of course each parameter can be individually modified to fit the owner's 108 needs. However, according to published policies and/or current law the bidding parameters can be automatically set. The Auditor 130 can get a print out of these parameters such that an independent third party can verify such compliance. The parameter setting can dictate what an auditor 130 and monitor 132 reviews during the process.

As illustrated by block 310, based on further selection of the management/authority type parameters the system can remove irrelevant questions in the list of questions, can remove steps or phases of the project or can modify how the step is executed. As illustrated by block 312, the organizer can be queried as to schedule aspects of the project. One series of questions can be when the invitation to bid will be published when preliminary information is required, such as bonding, the deadline for subcontractor bids/input, deadline for general contractors (112-116) input, when the bids will be read and the contract awarded, when constructions is to begin and when each phase of the project is to be completed, bonus payment/penalty payments for meeting/missing such deadlines, and when the progress payments are to be made and when the final payment is to be paid. In addition, procedural questions can be asked and answered as to what stages, substages are to be included in the process and when or in what order such processes/phases, sub-process/sub-phases will start, meet milestones and be completed.

As illustrated by block 314 queries and answers regarding financial parameters can be administrated. For example, the system can acquire if the owner 108 will require financial statements from contractor (112-116) prior to award of the bid, if the contractors (112-116) requires a letter or credit from the owner 108 for a specific project before the work will begin, (i.e. evidence that the owner 108 has the money to pay for the work), Interest rates for late payments from owner 108, penalties based on missed, quality, etc., liquidated damages and bonus clauses, schedule of values for contractors (112-116) billings, payment, draw procedures (event based, monthly weekly, quarterly etc.), administration of change order mark-ups, payment form, procedures, locations, tender, acceptance, billing retention, bonus/penalty clauses, any fees, such as governmental or sub entity fees what the bid bond requirements are, performance and payment bond requirements, maintenance bond requirements, builders risk insurance requirements.

As illustrated by block 316, and as continually updated by the system, based on data acquired by the system and based on answers to previously asked questions, latter questions of the system can become irrelevant and can be tagged as not active or as inactive. As illustrated by block 318 the system can acquire parameters related to testing or any quality control measures or processes whether they are desired or required and by whom. For example, some quality control measures might be managed or monitored by the owner 108, architect 106, engineer 110, contractors (112-116), or a subcontractor or a combination thereof. Included in this testing, requirement can be specific requirements for acquiring a test from an approved or accredited lab (for example on soil compaction or slump of concrete) and how, when, and where and prerequisites for such testing. Specific requirements can also include how and when such results need to be submitted who will approve of the test results and under what conditions and what approvals are needed from whom prior to the starting or completing another task. Requirements can also include conditions that need and test results that need to precede other defined additional construction or commencement of an effort and what happens is a test fails or get behind schedule. For example, testing of the soil under a structure must meet a specific density using a specific test from a specific lab and such results must be independently approved by a management firm prior to pouring of the footings for the structure. Other requirements may include local or national requirements or special inspections required by building codes, environmental requirements or environmental testing requirements for natural phenomena such as earth quakes hurricanes etc.

Some of the queries above could be required for all land improvement projects, public, private and government alike just to better guide an organizer with little experience. As illustrated by block 320, and as continually updated by the system, based on data acquired by the system based on questions asked prior, latter questions of the system can become irrelevant and are tagged as irrelevant and rendered inactive such that they are not asked by the system because the answer to such a question would be irrelevant. As illustrated by block 322 parameters regarding responsibility for providing, getting approvals for utilities (temporary and sustained), such as electricity, water, sewer gas, waste collection etc. Parameters acquired by the system can include who (with contact information) will be the utility service providers, responsibilities for management and expense of temporary and permanent utilities including consumption, payment arrangements, when and how utilities will be transferred to owner 108 and any payments associated therewith.

As illustrated in block 324, the system can acquire parameters related to treatment and administration of revisions, corrections and changes to the items at all or various stages/phases of the project such as to the initial bid package or to the finish improvement. For example, a parameter regarding addendums that must be acknowledged by a bidder on the bid form at the time of bid submission, what private work on the project the owner 108 wants the contractors (112-116) to participate in such as value engineering 110 some of the work to lower the bid amount or speed up the schedule can be acquired. During this process the contract can have suggestions as to means and methods that potentially could result in owner 108 cost savings.

This revision process could also include incentives to the bidder with a percentage of the savings being payable to the suggestor of the change such as a bidder, a contractors, a subcontractor, an engineer etc. Additional queries can include what will be the preferred or required instrument for changes after the contract is executed. Additional revision queries and input can include supplier requirements for example, what material will be specified in the contract documents and what single source suppliers that an owner's 108 desires to use for a particular part of phase of the project.

As illustrated by block 326 and as continually updated by the system, based on data acquired by the system based on questions asked prior, latter questions of the system can become irrelevant and are "knock out." As illustrated by block 328, the system can acquire workforce related parameters for the Project. Workforce requirement might include SOC requirements per above, required professional licenses/qualifications, credit or safety qualification requirements, union requirements, wage determination clauses, project labor agreements (PLAs), Davis Bacon prevailing wage requirements, state preference laws (where only state residents may be employed for certain public funded work), minority labor pool requirements, certification of non-segregated facilities, proof that minority firms were contacted for projects with MBE/WBE goals and any additional labor requirements, not indicated above including the weighting of contractor (112-116), bidders resulting from existing or desired business relationships, relatives, preferences etc. It can be appreciate that workforce questions can acquired near the end of the process since that answers to such question on this topic only knock out only a minimal number of questions in the database.

As illustrated by decision block 332, the system can audit the parameters received to see if the system has all of the parameters required to configure a project and if any of the answers are in conflict and any problems and risks can be identified. If the audit finds issues, then as illustrated in block 334, the system can locate queries to be asked to address the deficiency/discrepancy and the system can move back into the process at a block/stage where the query would have normally been asked. As the block are encountered that eliminate questions the process can rapidly progress to the audit again because the majority of questions will have been removed. As illustrated by block 336, the parameters can be compiled and organized and thereafter the process can end.

In some embodiments, the organizer can be asked if the system is to be used to perform a mock run to determine if a project is even feasible or can meet specific goals. Thus, the estimator, user can enter "dummy" data or guesses into the system to see if a Project having certain parameters can meet certain budgetary and cost requirements. Such a system setting can avoid the requirement that certain queries need to be answered. This configuration will allow a user to see how a government classification can be modified to make a hybrid quasi government project. In another example, if with a few questions it can be determined how a government project of a certain type will be administrated, then the system will can automatically invoke minority programs/processes/accounting processes/inspection requirements which can be rejected the user. Thus, by allowing such dry runs, the user can model their administrative process/system after certain type of project with desired modifications.

Referring back to FIG. 4, and as stated above the process can start at block 402 and proceed to block 404 where the framework for the entire process can be set-up or configured. Such a set up will dictate which steps in FIG. 4 will be executed and how and when they will be executed. The system configuration and parameters acquired according the description provided in FIG. 3, can be separated by the system into two or more phases, for example posting an invitation to bid phase, a bidding phase, bid and bidder auditing, acceptance and qualification phase, an awarding phase and results publication phase, a pre-construction phase and a construction phase, a closing phase and post project data compilation, sale and distribution phase.

Accordingly, based on the acquired parameters the system can automatically configure what phases will be set up to administrate the process. In accordance with some embodiments, the system relates the different phases to each other based on parameters that the phases have in common and the effect each parameter has on each phase. Thus, in accordance with block 405 parameters acquired by the system can be utilized to select, implement and set up one or more of the phases. In addition based on parameters, the system can locate, gather and post sets of documents related to and required to administrate the process. For example, the system could retrieve minority related requirements from an affirmative action/government website, building code requirements, the financial requirements documents and many other applicable documents and post them to the website where the constructions specification are posted as part of the invitation to bid. Based on the parameters the system can also retrieve the appropriate legal, financial, contract, forms etc. documents. The system can also provide links to webpages that contain such information or forms that can be electronically filled out and submitted. It can be appreciated that the disclosed system is environmentally friendly because the system allows for paperless administration of a construction project where heretofore hundreds possibly thousands of pounds of paper have been expended to administrate such projects.

As illustrated by decision block 406, it can be determined if the set up configuration is acceptable. An audit can be performed and if problems/issues with the set up are determined, then the system can notify the administrator as illustrated by block 408. The system configuration/set up can be audited to determine if the bidding parameters are complete and in compliance, that the construction specification is complete and that all critical parameters are defined such that the invitation/bidding and construction process can be efficiently managed, administrated and executed. Such an audit can be performed by an auditor 130 or monitor 132 of FIG. 1.

At administrator the system can query a user and acquire or clarify parameters and correct the deficiencies and the framework can be reconfigured as illustrated by block 404. If it is determined that the set up configuration is acceptable, then notice can be executed, or the invitation and documentation can be broadcast or made public in accordance with the set up parameters, as illustrated by block 412. Posting can include sending electronic messages and documentation packages links to the appropriate parts. In some embodiments, when a contractor (112-116) creates an account an initial password for access to the website will be created by the user. Each bid submitted by general contractor (112-116) can have a unique randomly generated password. The bid can be encrypted during the submission process and only be revealed when the administrator 105 releases the bids for view to the interested parties or the public depending on the type of bid private or public. Some of the posting/notifications can be based on entries into a contact database. Thus, with a single user input, post invitation, the system can automatically generate and send hundreds of e-mails to contractor (112-116) and subcontractors (118-122) and can also transmit the project to bidding sites which can post the project documentation, and can also send packages to online plan rooms 140.

As illustrated by block 414, bids can be received and reviewed. In all phases the system can accept feedback and other inputs and data such as bids, e-mails, acceptance notices, bonds, contracts, acceptances etc., and can provide, detect monitor and record user identification and logins. Data can include the sign up information from contractor (112-116), subcontractors, material suppliers, questions, bonding agency 150 information, comments etc.

As illustrated by decision block 416, for each submission and/or bid it can be determined if the submission/and or bid meets the requirements as set forth by the parameters. If the bid is deficient then a non-compliance message can be sent to the proper entity such as the general contractors (112-116), a subcontractor (118-122), and a bonding agency 150, an engineering firm 110, an architect firm 106 etc., as illustrated by block 420. Prior to the bid dead line the system can continue to receive bids as illustrated by block 414.

The identified deficiencies that is making the bid deficient and suggested corrective action can be sent to the party responsible for the deficiency (and anyone associate therewith (i.e. partner, team member etc.) Automatically generated, communicating specifics of deficiencies in bids via electronic messaging, e-mail text, social media, etc., allow for efficient resolution of the issues flagged by the system. Possible problems with the bid submission requirements could be an applicant has not submitted a bid, a bond has not been submitted, insurance documents, such as builders risk insurance has not been included, the bid form is incomplete, the bid form has not been properly executed/authorized, the alternates are incomplete, the addenda are not acknowledged, the worker guidelines such as WBE and MBE guidelines have not been met etc. If any of these items are required and not included in accordance with the initial bid set up by the administrator 105, the submitted bid would be considered deficient and would not be considered. Depending on the set up parameters as illustrated by, block 418 the system can act as an early warning system to (in some cases automatically, without human intervention) notify the appropriate party of actual, possible or potential problems. Such a novel feature can help involved parties eliminate bid mistakes and disqualification from the process. As illustrated by block 423 the party with the deficient bid can take correct action and resubmit the bid.

In some embodiments, each sub-contractor can be associated with or can be teamed with another party such as a general contractors (112-116) and the subcontractor (118-122) can submit their bid to the other party such as the general contractors (112-116) via the disclose system/process. As illustrated by block 418, before the main bid deadline, a subcontractor (118-122) bid deadline can close and each concerned, related party can be notified of any and all deficiencies of the subcontractors bid at that time prior to the main bid deadline to allow the general contractors (112-116) or other party to submit a bid in place of the sub such that the main bid will not be deficient.

If decision block 416, is determined that a bidder has met the minimum requirements, the process can proceed to block 418. In some embodiments, if a bond does not meet the published criteria, then the administrator 105 can select a reject button and the system can send an indicator (email, text message, twitter message to the selected contractors (112-116), the system could also notify all bidders that an addenda has been issued and that the bid date and time has changed) to the contractors (112-116) having the defective bid bond.

If it is determined that the bidder has met the requirements, then as illustrated in block 418, a predetermined time before the bid deadline, the subcontractor's (118-122) ability to access to make or modify their bid can closed. This parameter can be set and or controlled by contractors (112-116) even after this predetermined time if desired. If this predetermined time has not past the bids can continue to come in and be modified as illustrated by block 414. As illustrated by block 419, the bid acceptance period/process can close and all entries into the system can be locked. As illustrated in block 424, it can be determined if there are any manual bidders. If there are manual bidders then the process can proceed to block 426, where the bidder's data can enter into the system. If there are no manual bids then the process can proceed to block 428.

Although an audit can and should be conducted continuously throughout the process, before the bids are actually read or published, a last minute audit can be conducted to ensure that the process has been fair and in accordance with the parameters set and with any applicable laws. Thus, if at block 416 the audit reveals problems then as illustrated by block 423 corrective actions can be taken.

As illustrated by decision block 422 after the bidding has been closed, it can be determined if there are any manual bidders 426 who have physically delivered a hard copy of a bid. If there are paper/manual bidders, then as illustrated in block 426, the administrator 105 can manually enter the data as the administrator 105 reads it from the paper submitted. As illustrated by block 428, the system and the administrator 105 can identify deficient bids and as illustrated by block 430 can disqualify deficient bids bidders and their team members.

As illustrated by block 432, the administrator 105 can disclose all bids with the touch of a button and the system can list the bids in an order set by the parameters. For example the bids can be displayed from lowest to highest or by a combination of factors that are weighted using a particular formula.

Thus, the disclosed bids can be sorted on screen in an order as dictated by parameters such as ascending order with supporting statistics as to the bids. Depending on the initial set up or parameters set by an organizer and/or a contractors (112-116), subcontractor (118-122), owner 108, material suppliers etc. they can logon and view limited specific data related to the ongoing bid submission process as it unfolds. Depending on the bidding parameters when the administrator 105 discloses all of the bids everyone involved can be logged into the award website and can view the awarding as if everyone was at the administrator's office even though they are half around the world.

As illustrated by block 440, data from the entire process can be compiled and Meta data regarding costs cost savings timing, entity performance etc., can be created. Such data can be valuable to all parties for all phases of construction projects. Reports can then be generated for the appropriate authorities such as the average median and standard deviation for subcontract bids.

The compilation can be provided to many different parties such as an owner 108/administrator 105/engineer 110/architect 106 such that the appropriate parties can review either a portion or the entire the project documents and check each one of the items in the list above. Contractors (112-116) s (112-118) will then be able to search project data via keywords etc., for bids and can be provided with an abbreviated or concentrated version of special requirements for the project. This is unique in the fact that contractors (112-116) typically diligently review the front end documents provided by the Architect 106/Engineer 110 and determine if the requirements will exclude their firm from providing a proposal for the project. This system will allow an administrator 105 to complete the front end review and save contractors (112-116) time in the project selection process. Thus, review of the document package can be parsed such that the appropriate professional can review the documentation that is generated.

Generally, the system allows contractors (112-116) s (112-118) to submit their bid electronically prior to the bid deadline in a secure confidential manner. Any bids received after the deadline can be not accepted or rejected as non-compliant. If all bids are electronic, with no paper and with the selection of one button everyone involved can instantly see the bid results online from a smart phone or a personal computer. It can be appreciated, that thousands in travel and paper are not necessary for placing a bid in accordance with the disclosed process, which is also environmentally friendly reducing carbon emissions from cars traveling to the bid locations and saving trees that convert the carbon emissions to oxygen.

The administrator 105 can set the bidding parameters such that data compiled on subcontractor (118-122) bids is available to different parties, for example, the contractors (112-116) s. This data can be published on a website that caters to subscribers only. This information can be valuable because if contractors (112-118) are not the low bidder they will typically like to know what subcontractors (118-122) are associated with the winning bid. In another scenario, the wining contractors might want to select a subcontractor (118-122) who partnered with another (losing) contractor (112-116) and had a lower bid.

The system can work in near real time as a subcontractors (118-122) bid could be received via email, reviewed automatically by a general contractors (112-116) algorithm and automatically entered into the general contractors (112-116)s bid. Thus, depending on general contractor (112-116) selected parameters such as an approval, audit 130 or set of rules for partnering subcontractors (118-122), a subcontractor's (118-122) bid can be accepted and posted at the last minute with a level of auditing set by a bidder-general contractors (112-116) automatically integrating or superimpose the subcontractors (118-122) bid on the contractors (112-116) bid and saving a step required in the current or traditional bidding process. The subcontractors' (118-122) can dictate when their bid is delivered via email by the system and their scope can be reviewed prior to the bid being posted to avoid last minute rejections. Such a check and balance can allow a subcontractor (118-122) to know that his bid has not been "shopped." In some embodiments, when a subcontractor (118-122) fails to submit a bid for a contractor (112-116) the contractor (112-116) can go to an alternate page and if authorized see subcontractors (118-122) who are willing to work with them and view the subcontractors (118-122) bid and team with a subcontractor (118-122) in the last minutes before the deadline. This website can only be accessible by contractors (112-116) where a subcontractor (118-122) has approved the contractor (112-116) for viewing and teaming and the system can provide real-time communication and data to authorize a contractor (112-116)-subcontractor (118-122) relationship during the bidding process. In some embodiments, such postings are automated to save the administrator 105 times where traditionally they have to answer phone calls.

As part of the awarding, the disclosed system allows the architect 106 to view parts of bids for the project, and approve a lot of the requirements in advance of the actual bid deadline. For example, the bid bond can be automatically handled via the internet directly from the bonding company. Also, the materials suppliers 125 bids could be submitted and approved electronically.

As part of the parameters, approved contractors (112-116) can be to an "approved bidders list" and the contractors (112-116) can receive an email notice that their submission has been approved as to form, for example, all of the required entries have been made. As part of the qualification process, contractors (112-116) who are not approved can receive email notification to log onto e-bidletting.com to review what requirement(s) are missing for approval to bid. As stated above, the system can operate in near real-time as on bid day the contractor (112-116) can open their page, and fill out the bid form and submits the bid for the project. Prior to a predetermined or specified bid deadline the general contractor (112-116) can have the option to change or withdraw their bid. This parameter can be set up front by the administrator 105. In most cases, a contractor (112-116) will have the option to withdraw or change their bid prior to the bid time and date.

After the bids are disclosed on-line, the system can automatically select a bidder pending final review, based on a number of criteria. After the contract is awarded the results from all bidders can be posted on a secure site so these results can be viewed by authorized persons on demand. The bid results can be stored in a relational database and can be displayed via a variety of spreadsheet applications. Thus, the system can automatically sort the bids based on a predetermined criteria using weighting factors if desired. In other embodiments the bid data in the database can be searched and sorted based on subscriber commands. Thus, a subscriber can sort the data in the database many different ways orders by many different parameters. For example bids can be sorted by the amount of the total bid in ascending order. In some embodiments, data can be sorted based on an owner 108 or an architect 106 of a city. In other embodiments Meta data on multiple projects from multiple owners 108 awarded to a particular contractor (112-116) can be accessed and reviewed.

Meta data and bid results can be made available on-line to the general public or to a group of subscribers for a fee. Subscribers or authorized viewers can log into a particular website and view bid results. The subscriber can sort and organize the data on-line and can sort and store the data online for future viewing. A subscriber can search the website using keywords and can point and click on a particular project name and correspondingly view bid results and data associated with the bid results for a particular project.

The system can provide different graphical user interfaces for each different class of user i.e. administrator 105, architect 106, owner 108, contractor (112-116), subcontractor (118-122), material supplier etc. The home page can be set up addition to determine which type of client/user is accessing the website. The website can have a home page can include advertisement, links and a search engine. The home page can also contain links to a login page a first time user page that can provide a get started guide and a user guide, and a demonstration page. Subscriber pages can include a search page. An architect's 106 page can include a contractor (112-116) quality page, a bid results page a bid release page and when the bidding deadline occurs a bid letting page.

In some embodiments, a first time user can be identified and a first time user can be identified and provided with the first time user page and training via a webinar. This page allows a first time user, whether it is an architect 106 or general contractor (112-116), to register their relationship, authorization code and contact information into the database. The first time user page can also provide a link to the legal page, which can explain legal rights for those who use the system. One link can also provide a seal of approval that a third party is acting as an auditor 130 and certifies that the bid process as the proper quality control is in place to be fair to all parties. The home page can require that all parties agree to the terms of the engagement before any party is authorized to use the system and access the websites.

In some embodiments, a demonstration page can be provided. The demonstration page can not only provide instructions but can provide graphics on how each page looks and operates. The demonstration can also provide simulations allowing a user to use the system on a trial basis. Thus, the demonstration page can provide simulated operation of the page in a time shorten scenario to assist a first time user in using the system. Initially, the demonstration page can provide an animated "tour" of the process so a user can sit back and watch the system work as though a "ghost user" was operating the system.

For example, the demonstration page can demonstrates to an owner 108, administrator 105 or architect 106 can list a project for bid, automatically send out invitations to bid, upload bid forms, receive and certify bid bonds and manage other important bid information. The demonstration page can also simulate the bid submission process by the general contractor (112-116) and simulate bid results. A bid search page can allow general contractors (112-116) to search the project data base to see if a bid has been let on a particular type of project or if a bid has been let for a particular type of construction in a particular city in a particular price range all on a single webpage.

Each class of pages, such as the administrator 105's page can have several linked or subpages. The architects 106 page can have an add project page which links to the bid search page. After a project is entered by an architect 106 the architect 106 can upload bid forms and verbiage, which can be viewed on the general contractor's (112-116) page for bid submission. The bid form can have defined fields for base bid and alternates and the administrator 105 can indicate how many alternates will be used on a project. The fields defined can dictate what is submitted to the system by the contractor (112-116). As a contractor sign ups to submit a bid on a spreadsheet can be filled out, by the architect 106 or by electronic verification, with check boxes for bid bond approval and other pertinent or qualifying information.

The general contractor (112-116) page will include components from the architects 106 page, the bid form is uploaded to the contractor's (112-116) page, to allow the general contractor (112-116) to fill out bid requirements; base bid pricing, subcontractors (118-122) or supplier's names, alternate pricing, completion time, non-collusion statements or other necessary requirements. This page will have the official bid clock for the project running on the page, the purpose of a bid clock is to inform all bidders of the official bid time, bids may not be submitted after the time specified in the instructions to bidders for the project. In some embodiments, a contractor (112-116) can submit a bid to the administrator 105s' approval page, where the contractor (112-116) has the option to revise or withdraw their proposal prior to the bid time specified in bidding documents. However, the general contractor (112-116) will not be allowed to revise or withdrawl the bid after a predetermined time according to the parameters.

In some embodiments, a subcontractor (118-122) on their page can view a bid search page and find a list of contractors (112-116) that have met the bidding requirements for a specific project. The approved general contractors (112-116) listed on the bid search page for a specific project can have a link that allows the subcontractor (118-122) to upload their proposal to specific general contractors (112-116) at a specified time. The ability to restrict a general contractor (112-116) from opening the proposal until the specified time helps keep the subcontractors (118-122) proposal from being disclosed and ultimately helps to protect subcontractor (118-122) proposals from bid shopping, a process of revealing a subcontractors (118-122) quote to another subcontractor (118-122) who could undercut the price.

The bid results page can be restricted to those who complete a registration form and agree to the terms of use, to log on and view the bid results for public bid projects. For private bid projects, the owner 108 can instruct, or require the architect 106 to restrict access to the bid results to a selected predetermined group. Affiliate links page can provide a portal for construction related business to post links to their websites. The system can accept drawings in CAD format and in an Adobe PDF format as specified by the ADOBE corporation "list specs professional for certification of bid The system can provide a Registration page, an Auditor's page 130, an owner's 108 page a contractor's (112-116) page, a subcontractor's (118-122) page and a material supplier's page. Subcontractor (118-122) access to the system can denied a predetermined time before the bid deadline of the contractors (112-116). For example, it may close down fifteen (15) minutes before the bid deadline. A contractor (112-116) can pick and choose among subcontractor (118-122) bids and this allows a secondary subcontractor's (118-122) bid to be used and the contractor (112-116) request an automated readjust just in time for the contractor's (112-116) deadline. In some embodiments, the general contractor (112-116) can change to a different subcontractor (118-122) at any time the request is open for bids.

In some embodiments, the system can be set up as a video conferencing site where the owner 108, architects 106 and contractor (112-116) can view the letting from the privacy of their office as if they were present at the letting or awarding of the contract. In some embodiments, Microsoft exchange compatible spread sheets, documents formatted in an Adobe PDF format and other documents can be uploaded to the website and contractors (112-116) and subcontractor (118-122) documents can be utilized to automatically populate the bid sheet. In some embodiments, the auditor 130 or monitor 132 can perform quality control and can log all interactions each party/user has with the host 102 or website. In some embodiments, an auditor 130 can see all activity in real time or simply as a log of user activities. A contractor (112-116) or a subcontractor (118-122) can be assigned a rating based on numerous metrics such as their credit rating, timeliness and quality of work.

The lock on the viewing ability on the bid amount and other input from each contractor (112-116) can be tied to the time clock of the host 102 (server time) computers. One safety feature implemented into the host 102 is preventing the time clock to be set forward such that bids would be revealed or accesses earlier that the predetermined letting time.

In some embodiments, the architect 106 may have the ability to post the names of the subcontractors (118-122) and material suppliers that have submitted a bid in on the project. After the bid is awarded the architect 106 may be able to obtain the names of successful subcontractors (118-122) and material suppliers who submitted bids to the successful general contractor (112-116) for future reference by other general contractors (112-116) as allowed by law.

A general contractor (112-116) may want to realign themselves in future bids with subcontractors (118-122) that often provide competitive bids and the system can provided the contractor (112-116) with this information. This way when a contractor (112-116) does not win, the system can automatically provide to the contractor (112-116) with the subcontractor (118-122) bids that are statistically higher that the other subcontractor (118-122) bids and by what percentage of compare other subcontractor (118-122) bids. This feature will help general contractors (112-116), subcontractors (118-122) and material suppliers to make better business decisions regarding pursuing a particular type of project (i.e. school, health care etc.).

In some embodiments, the site can display a recap of all important elements of the bid prior to submission of the bid or at least before the bid letting. If a contractor (112-116) changes a part of their bid or a subcontractor (118-122) changes a part of their bid even at the last minute before the bid letting, then the total bid presented to the administrator 105 would automatically be changed or posted saving a step as compared to the prior systems. An addendum modifies the contract documents prior to bid submission. In some embodiments, the bid cannot be submitted and will be automatically determined to be unresponsive unless all of the bid requirements have been acknowledged on the bid form, as result the unresponsive bid will not be revealed for example if the addendums are not acknowledged by the general contractor (112-116) on the bid form the bid will not be opened or revealed. The system can use a common bid clock (server time or the atomic clock in Colorado) to ensure that all bidders bid times are synchronized. This feature will ensure that all bidders are using the same bid clock. The system also has security features to keep bids from being revealed before the bid deadline.

Referring to FIG. 4, an administrator 105's home page is illustrated. The administrator 105 can receive architect-login side graphical user interface page and a contractor (112-116) can receive a page tailored for a contractor's (112-116) needs.

Each GUI 136 provided can be tailored with, for example, a project name with project details. Initially, the architect 106 can set up a project to be filled out by the architect 106. The system can automatically assign a unique Project ID. Each project can also have the name and contact information for the Architect 106 and details about the project such as project address and a category defining the type of project. Most of the data entry can be done with the aid of drop down menus. Other important information that can be entered by the architect 106 can be the due date and time for the bid. The system clock can synchronize with a global positioning system clock of some other reliable clock such as the atomic clock, a phone system clock or an Internet based server clock. Additional specification about the bid can be the base bid amount or budget fill out and the amount required for a bid bond and alternates.

As the administrator 105 enters project information, data parameters etc. each entry can be saved and posted to the site that is associated with a particular uniform resource locator (URL) or a set of URLs. The administrator 105 can then request a confirmation page that can perform checks on all data entered by any of the parties and can flag actual or potential problems. The administrator 105 can then review and issues that the system may locate and after administrator 105 review the bid can be submitted. Submission of the bid can include automatically generating e-mails and sending them to past or registered subcontractors (118-122) such that they are aware that a request for id has been posted at the site.

Thus, after an architect 106 confirms or selects the post button the system will auto generate a Project Information Page. When an architect 106 or a GC logs in the system can display all of the projects that they have active and all of the past projects. When a GC or an architect 106 selects a project by clicking on the project name they will be directed to the project page that provides data that is specific to a project.

The main page can allow for a search of projects by many criteria active expired, won lost etc. In some embodiments, the system can list active projects and closed projects where the bid has been let. In some embodiments, when architect 106 selects the winning bid the status of the project can change and therefore it would drop off the active list and be placed on the expired list.

In some embodiment, the contractor (112-116) can be locked out of even submitting a bid until the administrator 105 has approved the contractors (112-116) bond. Such a preventative measure will flag a submission as invalid or non-responsive. Thus, once a contractor's (112-116) bond is accepted the contractor (112-116) can proceed to enter a bid although the bid will not be revealed if other bidding requirements are not met based on the way the system is set up. In some embodiments, the administrator 105 will be able to identify and flag potential problems and notify a contractor (112-116) prior to bid submission which can help to eliminate non responsive bids from consideration and provide for seamless correction of many problems.

Figure 6:
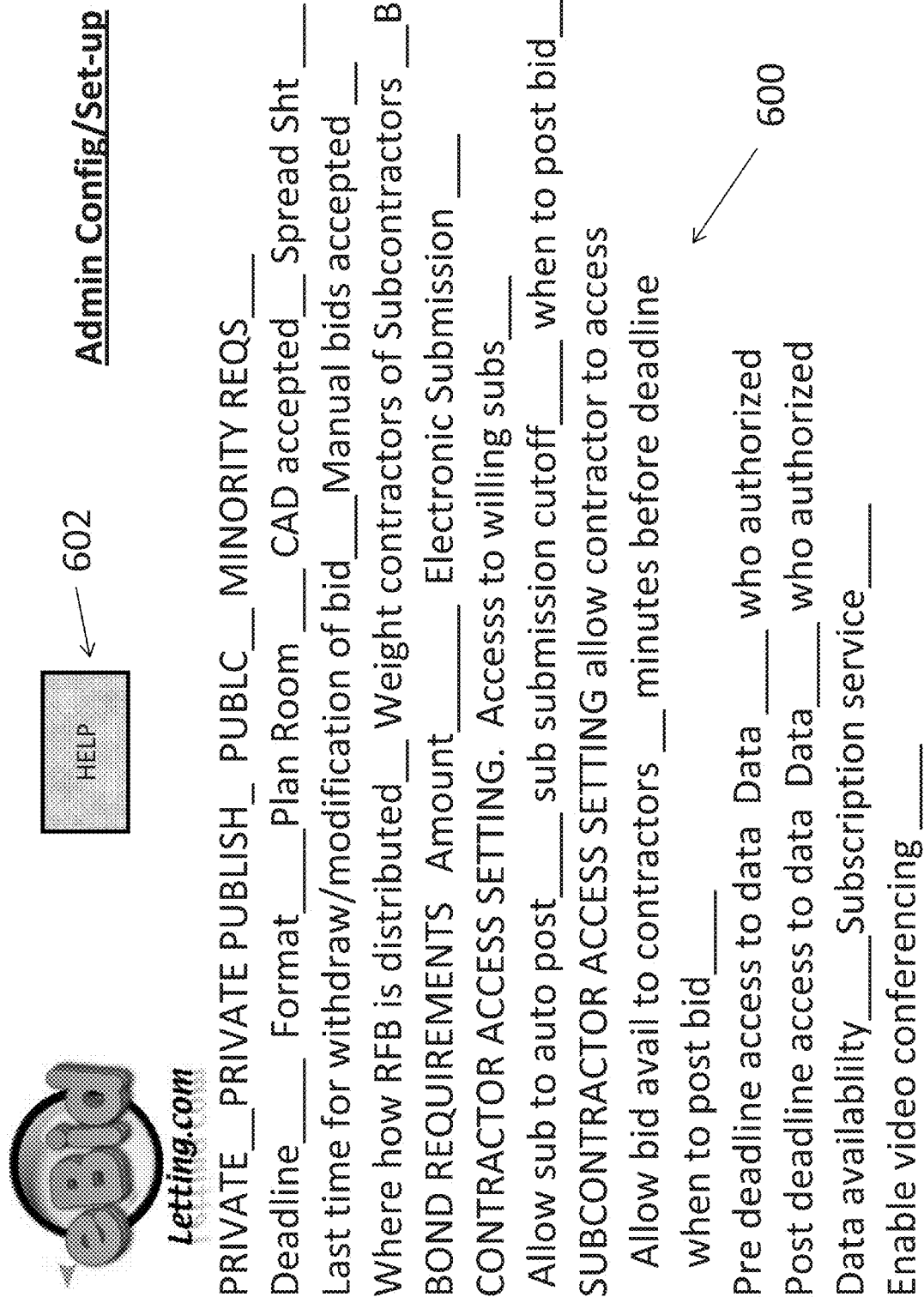
FIG. 6 is a graphical user interface that can query an administrator and receive administrator input.

Referring to FIG. 6, in some embodiments, the administration configuration set up page 600 can provide three distinct administration plans/templates, a Public, a Private and a Government plan/template. Although these admin plans have several administrative frameworks in common from a high level the bidding phase has different requirements based on the administrator 105 type, i.e. Public Private and Government. System set up can also include questions regarding project parameters such as will the administrator 105 advertise for Bids, will the project be a Design Build/Bid, a Build Lease will the project have Bid Bond Requirements, Performance and Payment Bond Requirements, Maintenance Bond Requirements, Builders Risk Insurance Requirements, Additional Special Requirements, Warranty beyond what is specified by law, Building permit requirements, Special phasing and working hours requirement, Testing Requirements, and if yes by which entity, the owner 108, architect 106 or contractor (112-116).

Additional questions which require input for administration set up include Temporary Utilities requirements and responsibly for such (Contractor (112-116) or Owner 108), State or Federal Fee requirements, Wage determination clauses, Project Labor Agreements (PLA) State Labor Requirements, Legal Requirements. confidentiality agreements, copyright notices or agreements, business relationship affidavits, Submit able exchange fees, Lien release requirements, Project agreement type, (examples) Corporate Project acquisition team requirements, Environmental testing requirements, Single source supplier requirements, Leadership in energy and environmental design (LEED) requirements, Payment/draw Procedures (Monthly weekly, quarterly etc.), Change Order Mark-up procedures, Payment form and procedures, Project billing retention procedures, Liquidated Damages, Bonus/Penalty Clauses, Schedule Requirements, Non-Collusion clauses/agreements, Minority requirements, Certification of non-segregated facilities, Proof that minority firms were contacted for projects with MBE/WBE goals, Required Pee-Bid Meeting Attendance, Bid requirements, Special Bidding Instructions, manual, hybrid Bid submission through bidding service, Reverse Auction Bid, Bid delivery instructions, Unit cost prices, Alternate pricing, subcontractor (118-122) disclosure, contractor (112-116), subcontractor (118-122) and owner 108 credit rating, safety record, and experience, pre-qualification requirements, Special Project Requirements, Meetings weekly, bi Monthly, Project Close Out Requirements, Close out Document Format, Special project requirements/procedures, meeting minutes distribution, milestone dates, Special Requirements for Government Work, SOC Code requirements, special government specifications, from OSHA, EPA, FEMA, FCC, FAA TSA, MIL, HSA, DOT requirements, special clearance requirements, Additional definable Fields to provide services and deliverables not listed which allows administrator 105 to provide additional items provided for in bid documents that are not listed.

In some embodiments, the non-exhausting list of questions could be associated with selectable or required "standard" clauses and some could be requirements for all types of projects, i.e. public, private and/or government. The administrator 105 could use this question and answer interaction to set up all of the required and desired project documents and procedures to administrating such documents and procedures in an acceptable manner and could via system reminders and automated communications continually be in compliance with each item in the list.

Based on the set up provided by the administrator 105 contractors, (112-116) can search for projects to bid on based on desired requirement and exclude projects with requirements that are undesirable. Thus, the system can provide a prospective contractor (112-116) with an abbreviated version of projects such as projects with specialized requirements. This provide increased efficiencies because contractors (112-116) typically pore over many front end documents provided by the Architect 106/Engineer 110 only to determine that some requirements exclude them or deter them from providing bidding or providing a proposal for a particular project. The system allows an administrator 105 to enter a front end that can be quickly reviewed by a potential bidder and because the front end can provide a quick reference to requirements, this can save contractors (112-116) a significant amount of time in their project selection process.

In some embodiments, the project set up configuration can include the types of Occupational Employment Groups. For example, whether that project will require First-Line Supervisors/Managers of Construction Trades and Extraction Workers Boilermakers masons Carpenters Carpet Installers Floor Layers, Except Carpet, Wood, and Hard Tiles Floor Sanders and Finishers Tile and Marble Setters Cement Masons and Concrete Finishers Terrazzo Workers and Finishers Construction Laborers Paving, Surfacing, and Tamping Equipment Operators Pile-Driver Operators Operating Engineers and Other Construction Equipment Operators Drywall and Ceiling Tile Installers Tapers Electricians Glaziers Insulation Workers, Floor, Ceiling, and Wall Insulation Workers, Mechanical Painters, Construction and Maintenance Paperhangers Pipe layers Plumbers, Pipefitters, and Steamfitters Plasterers and Stucco Masons Reinforcing lion and Rebar Workers Roofers Sheet Metal Workers Structural Iron and Steel Workers, and Tile and Marble Setters Helpers Carpenters Helpers Electricians Helpers Painters, Paperhangers, Plasterers, and Stucco Masons Helpers Pipe layers, Plumbers, Pipefitters, and Steamfitters Helpers Roofers Helpers, Construction Trades, All Other Construction and Building Inspectors Elevator Installers and Repairers Fence Erectors Hazardous Materials Removal Workers Highway Maintenance Workers Rail-Track Laying and Maintenance Equipment Operators Septic Tank Servicers and Sewer Pipe Cleaners Segmental Pavers Construction and Related Workers, All Other Derrick Operators, Oil and Gas Rotary Drill Operators, Oil and Gas Service Unit Operators, Oil, Gas, and Mining; Earth Drillers, Except Oil and Gas Explosives Workers, Ordnance Handling Experts, and Blasters Continuous Mining Machine Operators Mine Cutting and Channeling Machine Operators Mining Machine Operators, All Other Rock Splitters, Quarry Roof Bolters, Mining Roustabouts, Oil and Gas Helpers Extraction Workers and Extraction Workers.

Figure 5:
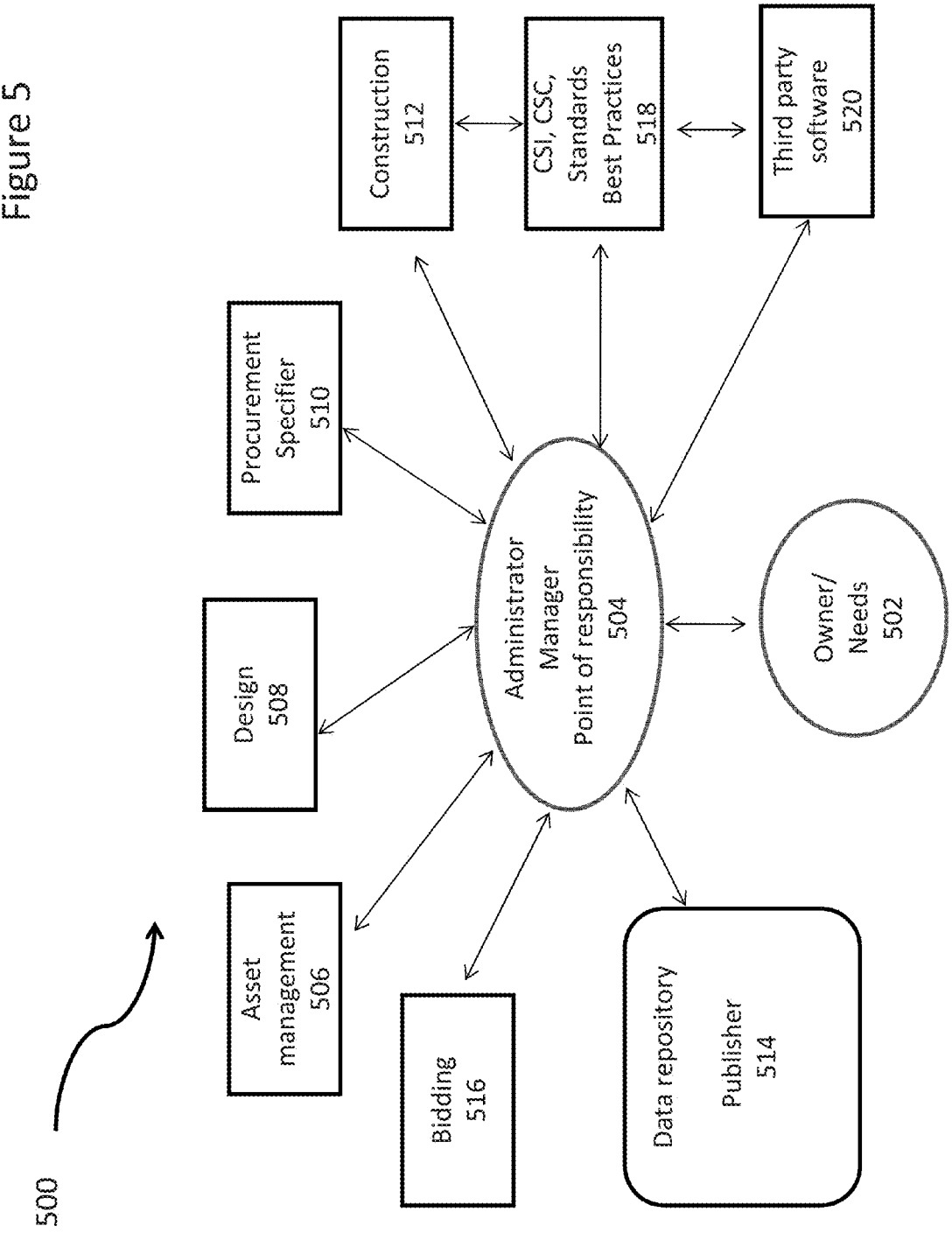
FIG. 5 is a diagram showing communication links that could connect servers that administrate a process between various modules and/or sources of information.

Referring to FIG. 5, a block diagram of a construction management system 500 is illustrated. The system can include an owner 502 module 502, an administrator 105 modules 504, a publisher 514, a bidding module 516 an asset management module 506, a design support module 508, a procurement module 510, a construction module 512, a standards module 518, and third party software module 520. The disclosed embodiment can be compatible with current standards in the construction industry such as the specifications provided by the Construction Specifications Institute. The system can accept data from standards organizations like CSI and best practices data. In some embodiments, the disclosed embodiments can accept data from Master Spec, Master Format, Uniformat, Speclink, Reed Construction Data, and ASTM standard for sustainability assessment of building products, Omniclass, SpecsIntact and PPDF. Such supporting infrastructure and materials can provide administrator 105 modules 504 with standards for organizing specifications and other written information for the project. Some embodiments can follow these standards when organizing information about a construction project, its requirements and associated activities. Thus, the disclosed embodiments can utilize the familiar CSI standard formatting guidelines to format the construction specifications for the construction process. The disclosed invention can assist the administrator 105 in classifying and locating specific types of information and diving the information into three parts "general," "products," and "execution."

Some embodiments allow for an efficient way to make a "standard" presentation of construction details and related information to all of the concerned parties (i.e. 502-520). The presentation can be divided by the functional elements of each sub project. For example, the project can be divided into site prep, substructure, and shell, dry in, interior, amenities and services. The format provided by the system 500 allows for improved communication among all parties (i.e. 502-520) involved in construction projects.

The system 500 allows for the administrator 105 504 and all parties (i.e. 502-520) to effectively communicate, increasing teamwork between so many parties allowing a project team (i.e. 502-520) to deliver structures and improvements to the owner 502 according to owner 502 specified requirements, timelines, and budgets.

The disclosed embodiments can also utilize the SpecsIntact (Specifications Kept Intact), system to classify and organize a construction project. In this embodiment the system 500 can provide automated specifications processing for preparing government construction projects that use a standard master specification. Such a specification might include a format referred to as Master Text or Masters, which can be supplied by different government agencies.

The system 500 using such the SpecsIntact format or specification can provide a robust and comprehensive system to facilitate projects for federally funded projects such as for NASA, the armed services, or various other federal agencies United Facilities Guide Specification which can be found on the Whole Building Design Guide website.

The bidding module 516 can classify and administrate many different bid functions such as Bidding Requirements to include Bid solicitation, Advertisement for Bids, Bidder's Qualifications, Invitation to Bid, Request for Proposal, Instructions to Bidders, Supplementary Instructions to Bidders, Bid Scopes, Pre-Bid Meeting, Information Available to Bidders, Preliminary Schedules, Geotechnical Data, Existing Conditions, Environmental Assessment Information, Project Financial Information, Permit Application, Bid Forms and Supplements, Bid Forms for Construction Management, Cost-Plus Fee, Procurement, Stipulated Sum, Unit Price, Supplements Allowance, Alternate Form, Bid Security Form, Bid Submittal Checklist, Estimated Quantities Form, Proposed Products Form Proposed Subcontractors Form, Unit Price Form, Wage Rates Form Work Plan and Equipment Schedule, Representatives and Certifications Contractor's (112-116) Qualifications, Minority Business Enterprise Affidavit, Non-Collusion Affidavit, Qualification Statement for Waste Disposal, Statement of Disposal Facility, Workers' Compensation Certificate Schedule and Bidding Addenda.

Asset management module 506 can include a design support module 508 which can include and manage data related to engineers 110, architects 106 interior designers, landscape designers. Procurement module 510 can include and manage data related to material safety data sheets, suppliers, specifying entities, schedules, materials standards, supplier, qualifications and ratings for specifying entities and suppliers, specifications for materials to be supplied, delivery dates and how such materials are to be handled and utilized. Construction module 512 can include- and manage data such as contractor (112-116) qualifications and requirements, subcontractor (118-122) qualifications and requirements, visitor access systems, prebuilt assemblies, summary of work, work by owner 502, work covered by contract documents, facilities and space requirements etc.

Standards module 518 can include the CSI CSC standards, government standards, best practices standards such as those available from private organizations and government publications. The Standards module can also include general requirements summaries, multiple contract summary construction sequence, construction by owner 502, contract interface work restrictions, summary of contracts, access to site, coordination with occupants documentation, use of site, use of premises, project utility sources, price and payment procedures, administrative requirements, quality requirements, temporary facilities and controls, product requirements, execution requirements, facility operation, and facility decommissioning. Standards module 518 can also include basic site materials and methods, site remediation, site preparation, earthwork, tunneling, boring and jacking, foundation, load-bearing elements, utility services management, drainage and containment, bases, ballasts, pavements and appurtenances, site improvements and amenities, vegetation, planting, irrigation, and site restoration and rehabilitation, Standards module 518 can also include concrete specifications such as basic concrete materials specifications and methods for such concrete, concrete forming and required accessories, concrete reinforcement, cast-in-place specifications, precast material and placement, concrete decks and underlayment, grouts, mass concrete, concrete prep, restoration and cleaning. Standards module 518 can further include a masonry section which can include basic masonry materials and methods requirements, masonry units, stone requirements, refractories, corrosion-resistant masonry, simulated masonry, masonry assemblies, and masonry restoration and cleaning.

The standards module 518 can also include a metals section which can include basic metal materials and methods, structural metal framing, metal joists, metal decking, cold-formed metal framing, metal fabrications, hydraulic fabrications, ornamental metal, expansion control, and metal restoration and cleaning. The standards module 518 can also include wood and plastics which can include basic wood and plastic materials and methods specifications, rough carpentry, finish carpentry, architectural woodwork, structural plastics, plastic fabrications, wood and plastic restoration and cleaning The standards module 518 can also include thermal and moisture protection standards, including basic thermal and moisture protection materials and methods, damp proofing and waterproofing, thermal protection, shingles, roof tiles, and roof coverings, roofing and siding panels, membrane roofing, flashing and sheet metal, roof specialties and accessories, fire and smoke protection, joint sealers, doors and windows, basic door and window materials and methods, metal doors and frames, wood and plastic doors, specialty doors, entrances and storefronts, windows, skylights, hardware, glazing, glazed curtain walls, basic finish materials and methods, metal support assemblies, plaster and gypsum board, tile, terrazzo, ceilings, flooring wall finishes, acoustical treatment, paints and coatings, specialties such as visual display boards, compartments and cubicles, louvers and vents, grilles and screens, service walls, wall and corner guards, access flooring, pest control, fireplaces and stoves, manufactured exterior specialties, flagpoles, identification devices, access devices, pedestrian control devices, lockers, fire protection specialties, protective covers, postal specialties, partitions, storage shelving, exterior protection, telephone specialties, information technology and network 104 specialties, toilet, bath, and laundry specialties, scales, wardrobe and closet specialties, The standards module can also include an equipment section that specifies maintenance equipment, security and vault equipment, teller and service equipment, ecclesiastical equipment, library equipment, theater and stage equipment, instrumental equipment, registration equipment, checkroom equipment, mercantile equipment, commercial laundry and dry cleaning equipment, vending equipment, audio-visual equipment, vehicle service equipment, parking control equipment, loading dock equipment, solid waste handling equipment, detention equipment, water supply and treatment equipment, hydraulic gates and valves, fluid waste treatment and disposal equipment, food service equipment, residential equipment, unit kitchens, darkroom equipment, athletic, recreational, and therapeutic equipment, industrial and process equipment, laboratory equipment, planetarium equipment, observatory equipment, office equipment, medical equipment, mortuary equipment, navigation equipment, agricultural equipment, exhibit equipment, furnishing to include fabrics, art, manufactured casework, furnishings and accessories, furniture, multiple seating, systems furniture, interior plants and planters, furnishings restoration and repair, special construction to include air-supported structures, building modules, special purpose rooms, sound, vibration, and seismic control, radiation protection, lightning protection, cathodic protection, pre-engineered structures, swimming pools, aquariums, aquatic park facilities, tubs and pools, ice rinks, kennels and animal shelters, site-constructed incinerators, storage tanks, filter under drains and media, digester covers and appurtenances, oxygenation systems, sludge conditioning systems, hazardous material remediation, measurement and control instrumentation, recording instrumentation, transportation control instrumentation, solar and wind energy equipment, security access and surveillance, building automation and control, detection and alarm, fire suppression, conveying systems to include dumbwaiters, elevators, escalators and moving walks, lifts, material handling, hoists and cables, turntables, scaffolding, transportation and mechanical systems such as basic mechanical materials and methods, building service piping, process piping, fire protection piping, plumbing fixtures and equipment, heat-generation equipment, refrigeration equipment, heating, ventilating, and air conditioning equipment, air distribution, HVAC instrumentation and controls, testing, adjusting, and balancing and electrical to include basic electrical materials and methods, wiring methods, electrical power transmission and distribution, low-voltage distribution, lighting, communications, sound and video.

Referring to FIG. 6 an administrator 105 configuration set up page 600 is illustrated. The set up page 600 illustrates a number of questions that could be asked of the administrator during set up of process of the disclosed embodiments. FIG. 6 shows arrangements that allow for a construction project administrator or a bid administrator to review the requests for or ads for bids on a website such as the website ("ebidletting.com") and allows the administrator to review all or a subset of the bidding requirements. The upfront work by the administrator can configure the system and can assist contractors in making decisions to possibly submit a bid/proposal or pass and decline.

The help button 602 when selected can pop up or present a child window having selectable buttons associated with each question (not shown). Selection of an individual question in the child window can provide the user with an explanation of the question and explain the ramifications of entering a particular answer to the particular question.

Figure 7:
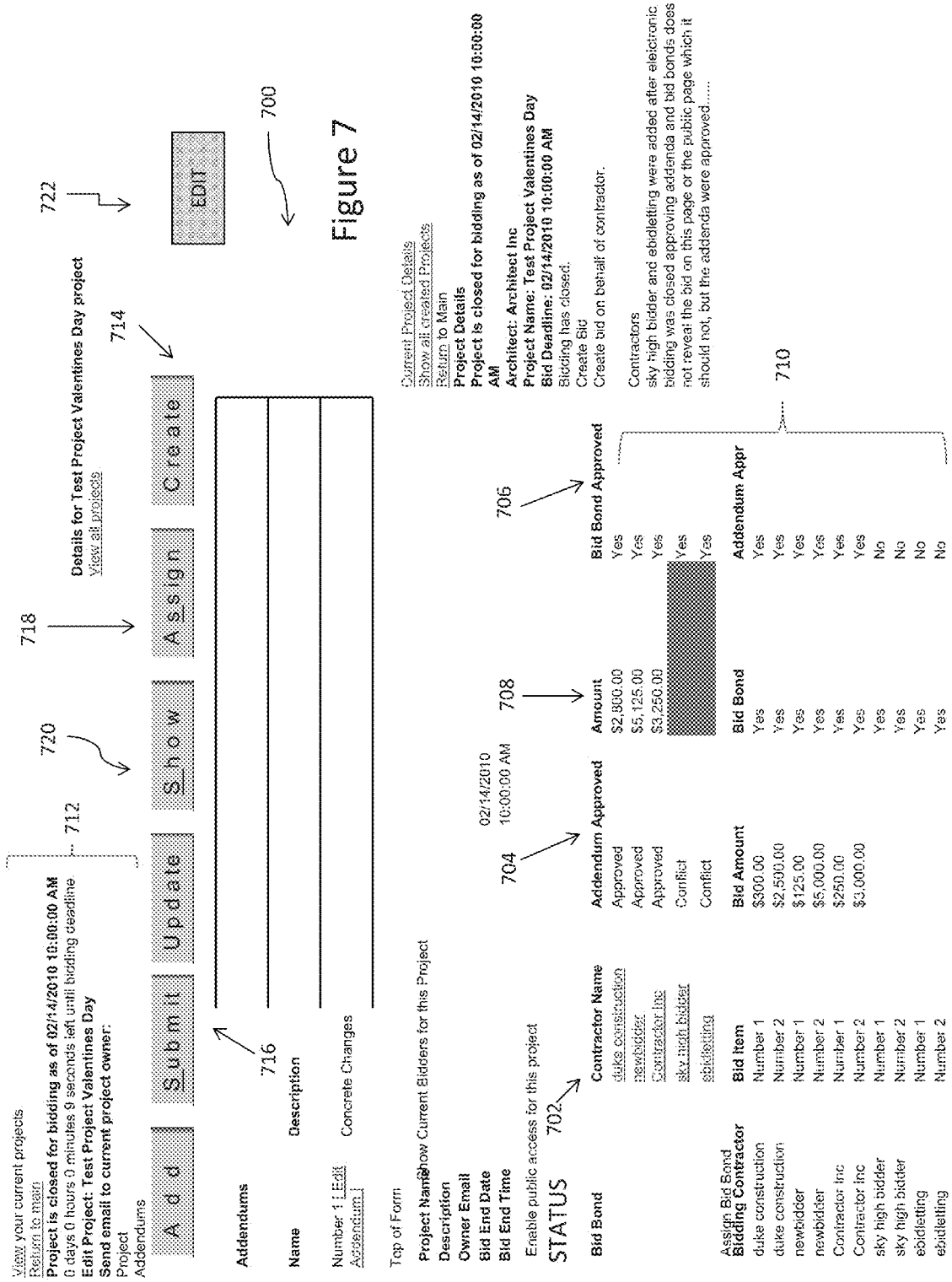
FIG. 7 is a graphical user interface that can be utilized as an interface to allow a user to navigate the disclose system and process.

Referring to FIG. 7 a project bid page 700 is disclosed. On this page 700 the contractor can view the status 702 of and can manage multiple projects. In addition using this page 700 a contractor, sub-contractor or supplier (users) can submit an electronic bid and once submitted can receive updates on the process and can receive confirmation on multiple aspects of the project such as Addendum approval 704 and bid bond approval 706 and the amount of the bid bond 708. A bidder/user can correct existing bids or submit updated bids or bid more than once prior to the bid submission time. In such a case, the system can overwrite previous bids with the latest or the most current submission.

The page 700 can provide the user with list of projects 710 as shown in the lower portion of the page. The page can also provide a status for each project bid on. When a project is selected details 712 of the project can be displayed in the in the upper left hand corner. Page 700 allows a user to quickly see important information on active projects, their due date & time and approvals for various aspects of the bids such as bond approval and addendum approval. Once the time has passed the system can archive the projects that have already been awarded such that they will not show up on the bid page.

In some embodiment, the awarded projects can removed from page 700 or can be shown as closed projects until removed by the user. Either way, as deadlines and critical dates pass, project data on the project info page can be updated with data related to the passing of the critical dates such as the winning bid and non-winning bids and bid tabulation results.

The administrator 105 can be provided with a bid approval page which can provide a list of all who have bid on each project, have been accepted, or have performed some other task. The administrator 105 can have the ability to check boxes next to a bidder's name and can also elect to disqualify a contractor (112-116) base on choice or any data provided by the system. Selecting and clicking on the a bidder's name the administrator 105 can move efficiently send many things to the bidder such as sending a bid notice page, which can provide a confirmation of acceptance of a bid and acceptance of various portions of the bid and can also provide confirmation that the bidder had the winning bid, was not the winner etc. with additional supporting information. Depending on the set up such notice can be automatically sent with or without the administrator 105 via e-mail.

In some embodiments, the contractor (112-116) can see and review the bid that the contractor (112-116) submitted in a secure environment any time prior to the bidding deadline. However, each bidder (i.e. contractor (112-116) sub-contractor, supplier, architect 106, engineer 110 etc.,) would not be allowed to see other bids. Thus, in a typical process no bidders would be allowed to see any bids at any level (but their own) until the bid administrator 105 releases the bids to the public. Depending on the initial set, until the bid award has occurred, the online bids cannot be seen by anyone and after the bid is awarded the administrator 105 can released the winning bid and possibly all bids to public via the website.

Some of the parameters can be modified after the bid has been awarded. For example, after the bid deadline a contractor (112-116) can be allowed to view list of other bids and bid amounts associated with each contractor (112-116) with the addendums and bid bond approved. The administrator 105 can decide after the award to enable or disable the public access feature which allows the contractor (112-116) bid data to be published after the deadline. On line bidders who do not have addenda and bid bond approved their amounts can be grayed out on the screen such that they cannot be selected by the architect 106 and awarded the project. In some embodiments, the administrator 105, architect 106 and the contractors (112-116) can see the list of bidders or those who intend to bid prior to the deadline.

Although it is preferred to make the construction administration process a "green" or "paperless" process the system can accommodate paper bids. The create button 714 can allow the administrator 105 to add hand delivered bids into the system. The paper bids can be physically delivered to the architect's 106 office prior to the bid submission deadline indicated in the instructions to bidders. In such a case after the administrator 105 reviews the paper bid package, the administrator 105 can check boxes indicating the bid has met the minimum requirements, time bonds, addendums etc. the administrator 105 can manually enter data from the hand delivered paper bid.

After entering data into the website, clicking on or selecting the submit button 716 allows the bid administrator to submit initial, updated or final bids to the e-bid letting platform. The assign button 718 allows the bid administrator 105 to approve the addenda and bid bonds after they have been reviewed and approved. The show button 720 can release bid information to the public for bids that involve public money. Depending on the initial set up and, for example, as a private bid the bid may or may not be released as directed by the owner 502 or it may be released to a select few people. The software can provide assurances to the users, including deactivation of the show button 720 such that in no case will bids or bid numbers for online bidders be revealed to anyone until after the bid is let, or awarded and can be released to the public. The edit button 722 can be active prior to the bid submission deadline and can allow a user to correct errors or make chances to previously submitted bid before the contract is awarded.

FIG. 8 illustrates a graphical user interface that can be utilized as a bid administrator dashboard 800. Selectable box 804 can provide a link for the administrator, after the bidding has closed, to create a bid on behalf of a contractor who does not elect to use the online bidding system and hand delivers the bid to the architect office prior to the bid time. The architect then can open the bid and fill out the bid for or on behalf of the contractor. Selectable box 802 can provide a link for assigning a bid bond and acknowledge the addenda included in a hand delivered bid meets the minimum criteria. Selectable box 806 can provide a link showing how much time is left till the bid submission deadline, for both electronic bids and paper bids which are delivered to the bid letting office. Selectable box 810 can denote that the bidding has closed the system has shifted into another mode allowing the bid administrator to open and enter manual bids and publish electronic bids. Selection of selectable box 808 allows the administrator to return to the current project to receive details any time prior to the advertised bid deadline and make changes to various projects by adding addenda, and moving a bid deadline forward, and add or modify other bidding requirements. The architect may also click the link to show all created projects and see the results of previous bids. The log out selectable button can takes the Architect back to the home page to end a session.

Each process disclosed herein can be implemented with a software program. The software programs described herein may be operated on any type of computer, such as personal computer, server, mobile device etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network 104, including wireless communications and cloud computing not sure if this is the correct location for this reference. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In some embodiments, the methods disclosed can be implemented in software, which includes but is not limited to firmware, resident software, microcode, etc. Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

System components can retrieve instructions from an electronic storage medium or a cloud type system. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include, compact disk-read only memory (CD-ROM), compact disk-read/write (CD-R/W) and digital versatile disk (DVD). A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure, that the disclosure contemplates methods, systems, and media that can provide the above mentioned features. It is understood that the form of the embodiments shown and described in the detailed description and the drawings are to be taken merely as possible ways to build and utilize the disclosed teachings. It is intended that the following claims be interpreted broadly to embrace all the variations of the example embodiments disclosed.

What is claimed is:

1. A computer program product to facilitate configuring and administration of a construction bidding project including a non-transitory computer readable storage medium including instructions that, when executed by a processor cause the processor to:
  store a plurality of predetermined questions where answers to each of the predetermined questions define parameters and a structure of a bid process for a construction project in a relational database;
  classify each of said plurality of questions with a first level, a second level, and third level based on how many of said plurality of predetermined questions become irrelevant based on a particular response to each question wherein the predetermined questions which have an answer that renders the largest number of predetermined questions moot as compared to other questions where answers render a lesser number of questions to be moot are classified with a first level and wherein questions having answers that make a least amount of questions in the plurality of questions moot being classified as third level questions;

store at least one predetermined answer to at least some of the questions, wherein at least some of the first level questions relate to attributes of a proposed improvement to land, at least some of the second level questions relate to building specifications and at least some of the third level questions relate to scheduling and bidding parameters for the construction project;

query a bid administrator for responses to questions assigned to the first level;

accept and store at least one reply from the bid administrator to at least one first level question;

compare the at least one stored reply to the first level questions to the predetermined answers associated with a respective question;

tag, as moot, questions that have become irrelevant in the first, second and third level based on the at least one reply to the first level questions;

request at least one reply to non-moot second level questions;

accept and store at least one reply to the non-moot second level questions;

compare the at least one stored reply to the second level questions to the predetermined answers;

tag, as moot, questions that have become irrelevant in the second and third level based on the replies to the second level questions;

request at least one reply to non-moot third level questions;

accept and store at least one reply to the non-moot third level questions;

compare the stored reply to third level questions to the predetermined answers;

tag, as moot, questions that have become irrelevant in the third level based on the replies to the third first level questions; and configure requirements and a timeline to meet the requirements of a construction bidding process where the requirements dictate actions to be taken by bidders in accordance with deadlines in the timeline based on the replies to the first, second and third level questions.

2. The computer program product of claim 1 further comprising configuring a bid-letting bid acceptance and management infrastructure based on relies to the questions and automatically communicating data related to aspects of the construction project to a bidder based on the configuration of the management infrastructure process.

3. The computer program product of claim 1 further comprising automatically configuring a bidding process as facilitated by a website awarding a construction contract resulting from a bidding process.

4. The computer program product of claim 1 further comprising accepting electronic bids packages via the website and automatically rejecting bids that do not meet one or more criteria as configured by the bid process.

5. The computer program product of claim 1 further comprising automatically providing bidders access to construction specifications to users in an electronic format, based on the configured bid management process.

6. The computer program product of claim 1 further comprising the prioritizing of at least one of the first, second, and third level question, giving highest priority to questions that have a higher probability than other questions that an answer to the at least one question will render a largest number of first second and third level questions moot and presenting the questions to a bid administrator in an order based on the priority of the question.

7. The computer program product of claim 1 further comprising automatically notifying a bidder via an electronic message when an electronic bid is not in compliance with conditions of the bid configuration management process.

8. The computer program product of claim 1 further comprising electronically posting in near real time on a website, what steps of the process are occurring and deadlines associated therewith to include: bids submitted, bids accepted, a winning bid and losing bids based on the bid configuration process.

9. The computer product of claim 1 further comprising automatically sending electronic data defining construction specifications to one of a permitting agency or a regulatory agency to facilitate a permitting process based on the configuration process such that an agency can comment or reply on zoning, building codes and other restrictions for the construction process.

10. The computer product of claim 1 further comprising automatically monitoring online activity to detect abnormal behavior regarding access to one or more websites facilitating the bid structure process and to determine compliance with parameters based on the configured process.

11. A method for structuring, configuring, and managing a construction bid process:

query using a bid administrator interface, a bid administrator with questions, pertaining to jurisdiction and regulations the questions presented in a hierarchal order, via a client machine using the bid administrator interface, to query and determine construction parameters, bidding specifications, asset management specifications, design parameters, procurement parameters and constructions specifications;

accepting and storing responses to the queries at a server;

retrieving one or more construction bid process compliance templates in response to the accepted and stored answers at a server;

automatically generating bidding and construction phases related to the project, each phase having scheduling and compliance parameters;

configuring automatically an online bidding process for display on a website based on the stored answers, the bid process configuring to include at least one of configuring an electronic mailing list, permitting and compliance authorities, project specifications, deadlines, project parameters, information access controls, website access control, bid submission parameters, bid bonding terms and conditions, bid acceptance parameters and contractor compliance parameters.

12. The method of claim 11 wherein the process compliance template includes one of a comprehensive project checklist, a bid process template, a construction specification process template, a financing process template, a government compliance template and a quasi-government compliance process template.

13. The method of claim 11 further comprising scheduling deadlines for predetermined compliance parameters and automatically generating electronic notifications to one or more parties of deadlines for complying with the parameters.

14. The method of claim 11, further comprising querying and registering bidders to the website to receive bidder information and classifying a bidder based on the bidder information and providing and restricting access to predetermined webpages based on the bidder information and configured bidding process.

15. The method of claim 11 further comprising automatically awarding a bid to a bidder based on acceptance of a bid submission and supplemental considerations based on the configured bidding process.

16. The method of claim 11 further comprising generating metadata about a plurality of bidding configurations and bid awards associated with the bid configuring process.

17. The method of claim 11 further comprising configuring a bid promotion acceptance and letting auditing configuration for compliance with governmental requirements and auditing the bidding promotion acceptance letter process for compliance with the governmental requirements.

18. A method for configuring and administrating a construction bidding process comprising:
    configuring a construction bid management process at a server, the process having a user interface and processing framework with parameters defining terms and conditions as automatically determined in response to answers based on queries to a bid process administrator;
    retrieving one or more process compliance templates in response to the bid process parameters;
    automatically configuring content for display on a website to facilitate administration of the construction bidding process in response to the process compliance templates;
    automatically configuring a messaging system to send notifications to prospective contractors;
    registering a plurality of visitors to the website by querying the visitors using a visitor application template;
    determining each visitor's role in the process based on responses to queries;
    qualifying visitors according to their role and configuring features that will be available to each of the plurality of visitor's based on each visitor's answers to the questions;
    parsing the construction project into sub-projects and requesting bids for each sub-project to visitors who are qualified for the role;
    accepting data from qualifying visitors via the website to include paperless bids, proposals and correspondence;
    deciding which visitor will provide services for each sub-project based on said qualifications;
    deciding which visitor will provide materials for each sub-project based on said answers;
    transmitting construction specifications related to the construction project to a permitting authority in a paperless manner based on said answers; and
    letting a bid for bidders that are in compliance with configured bid process.

19. The method of claim 18 further comprising automatically notifying one or more visitors prior to a bid deadline if the visitors input does not meet the parameters.

20. The method of claim 18 further comprising manually entering bid data from a paper bid received from a bidder via an administrator's interface.

* * * * *